(12) United States Patent
Yao et al.

(10) Patent No.: US 7,379,274 B2
(45) Date of Patent: May 27, 2008

(54) ROTATIONAL PZT MICRO-ACTUATOR, HEAD GIMBAL ASSEMBLY, AND DISK DRIVE UNIT WITH THE SAME

(75) Inventors: Ming Gao Yao, GuangDong (CN); Masashi Shiraishi, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 463 days.

(21) Appl. No.: 11/080,659

(22) Filed: Mar. 16, 2005

(65) Prior Publication Data
US 2006/0193087 A1    Aug. 31, 2006

(30) Foreign Application Priority Data
Feb. 28, 2005    (CN) .................. 2005 1 0052034

(51) Int. Cl.
*G11B 5/596* (2006.01)
*G11B 21/24* (2006.01)

(52) U.S. Cl. .................................. 360/294.4
(58) Field of Classification Search ............ 360/294.4, 360/294.1, 294.3
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,233,124 B1 * | 5/2001 | Budde et al. ............. | 360/294.4 |
| 6,515,835 B2 * | 2/2003 | Ezaki et al. ............. | 360/294.4 |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,950,266 B1 | 9/2005 | McCaslin et al. | |
| 7,130,160 B2 * | 10/2006 | Kwon et al. ............. | 360/294.7 |
| 2003/0147177 A1 | 8/2003 | Yao et al. | |
| 2003/0147181 A1 | 8/2003 | Shiraishi et al. | |

(Continued)

FOREIGN PATENT DOCUMENTS

JP    2002-74871    3/2002

(Continued)

OTHER PUBLICATIONS

U.S. Appl. No. 11/238,998, filed Sep. 2005, Yang et al.

(Continued)

*Primary Examiner*—Jefferson Evans
(74) *Attorney, Agent, or Firm*—Nixon & Vanderhye P.C.

(57) ABSTRACT

A head gimbal assembly (HGA) for a disk drive unit that includes a micro-actuator, a slider and a suspension to load the slider and the micro-actuator. The micro-actuator includes a pair of actuator side arms, a PZT element extending between and connecting the actuator side arms; a rotatable plate positioned between the actuator side arms, wherein the slider is mounted on the rotatable plate; and a pair of connection elements that connect the rotatable plate to the actuator side arms, respectively. The rotatable plate rotates in a first direction when the PZT element contracts and a second direction when the PZT element expands.

22 Claims, 18 Drawing Sheets

U.S. PATENT DOCUMENTS

| | | |
|---|---|---|
| 2003/0168935 A1 | 9/2003 | Ogawa et al. |
| 2003/0202292 A1* | 10/2003 | Arya et al. ............... 360/294.4 |
| 2006/0023338 A1 | 2/2006 | Sharma et al. |
| 2006/0050442 A1 | 3/2006 | Yao et al. |
| 2006/0072247 A1 | 4/2006 | Yao et al. |
| 2006/0082917 A1 | 4/2006 | Yao et al. |
| 2006/0098347 A1 | 5/2006 | Yao et al. |
| 2006/0146449 A1 | 7/2006 | Yao et al. |

FOREIGN PATENT DOCUMENTS

| | | |
|---|---|---|
| JP | 2002-133803 | 5/2002 |

OTHER PUBLICATIONS

U.S. Appl. No. 11/169,019, filed Jun. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

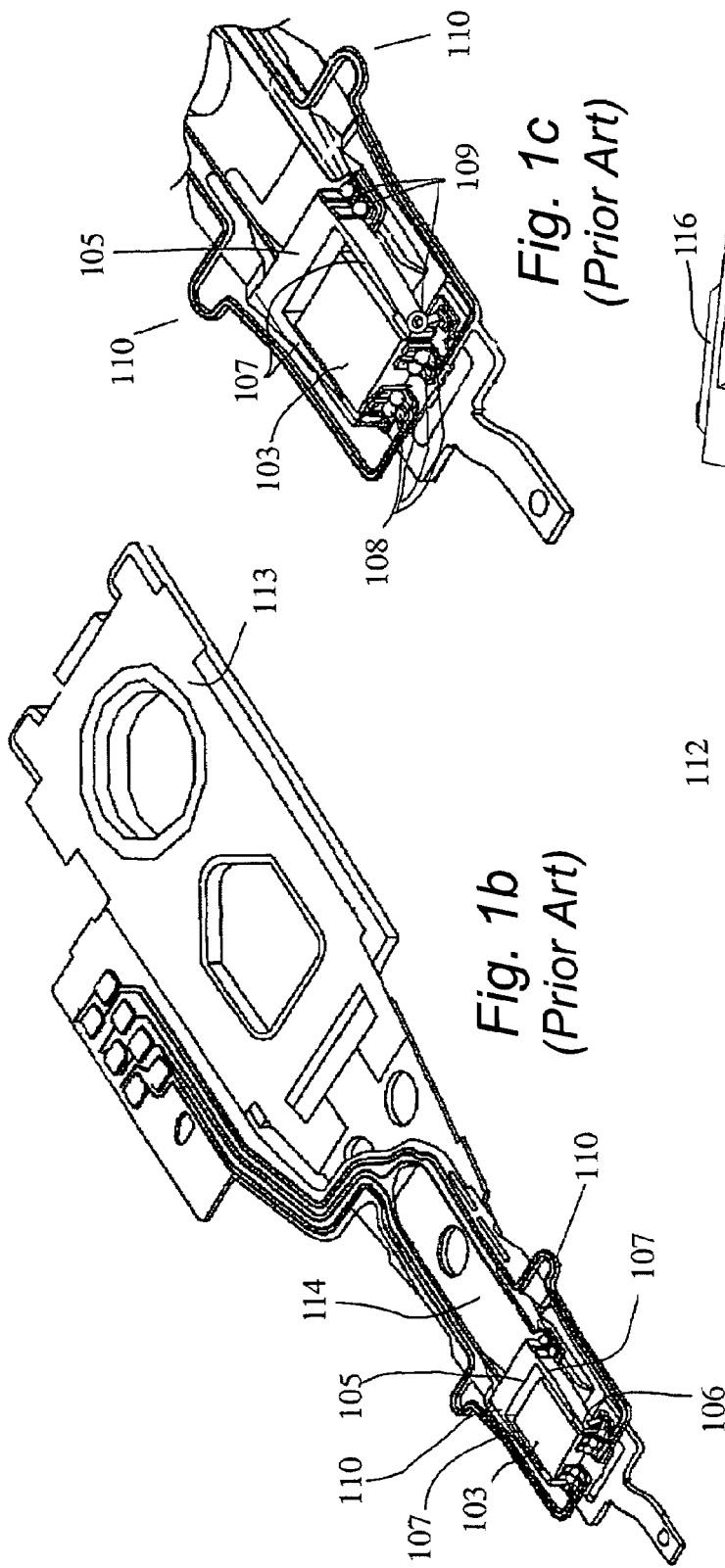
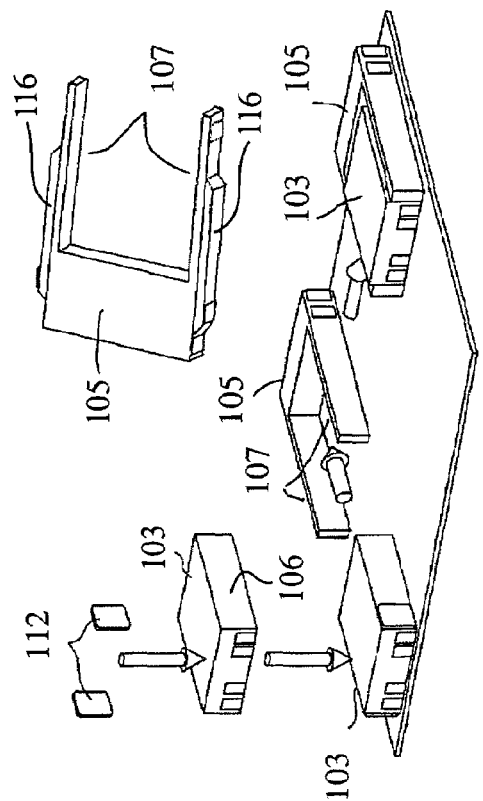
Fig. 1b (Prior Art)
Fig. 1c (Prior Art)
Fig. 1d (Prior Art)

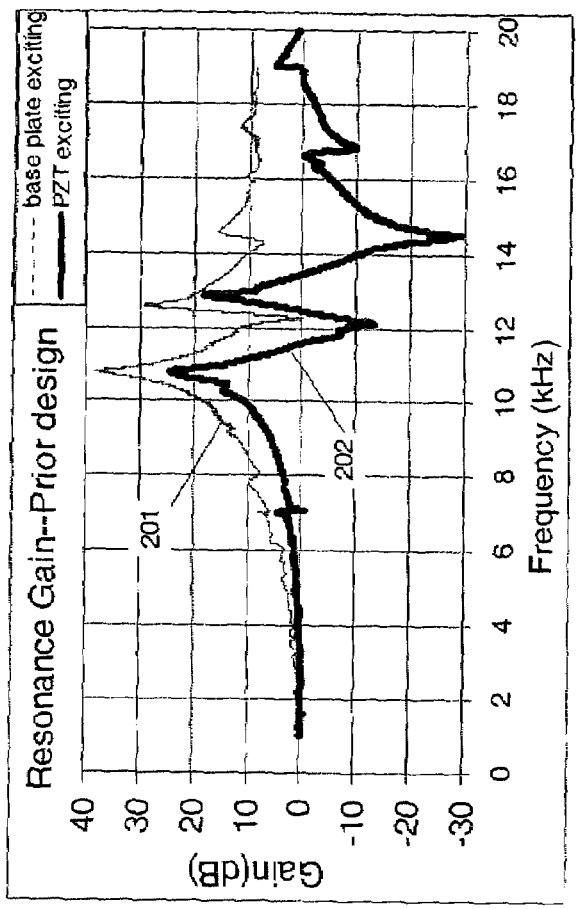
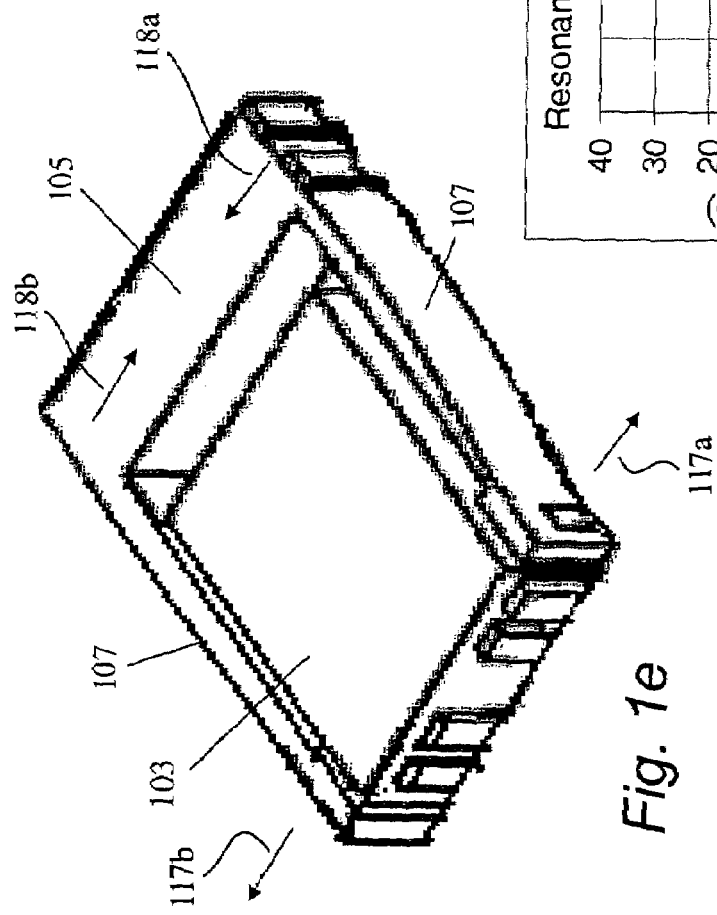
Fig. 1e
Fig. 1f

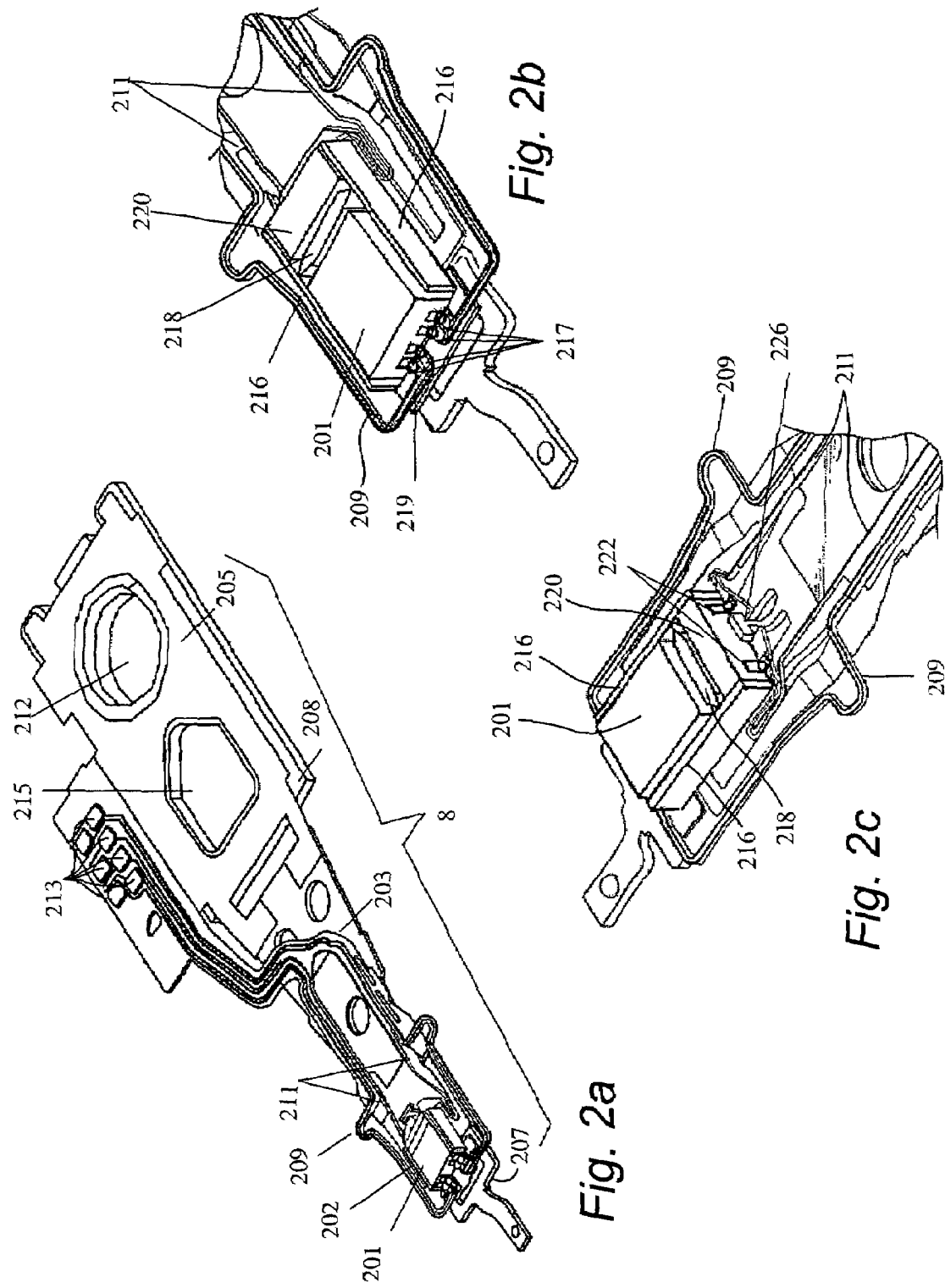

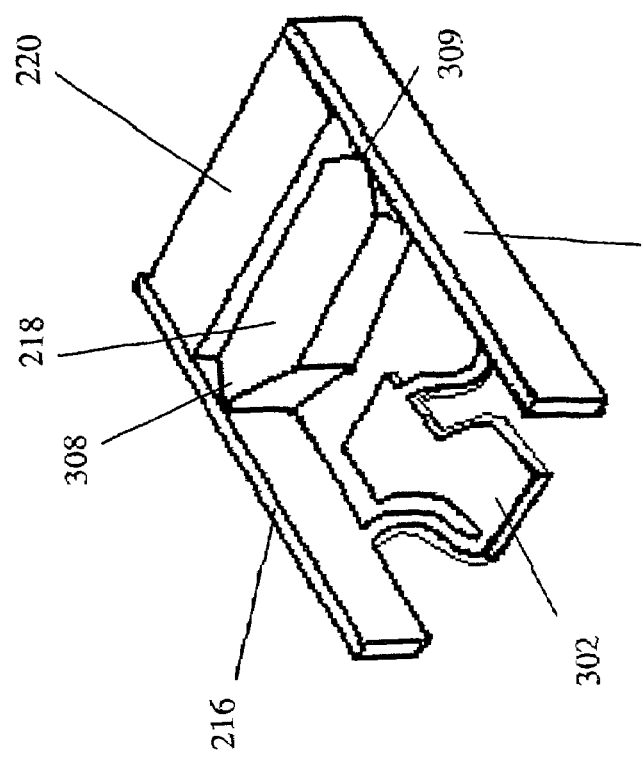
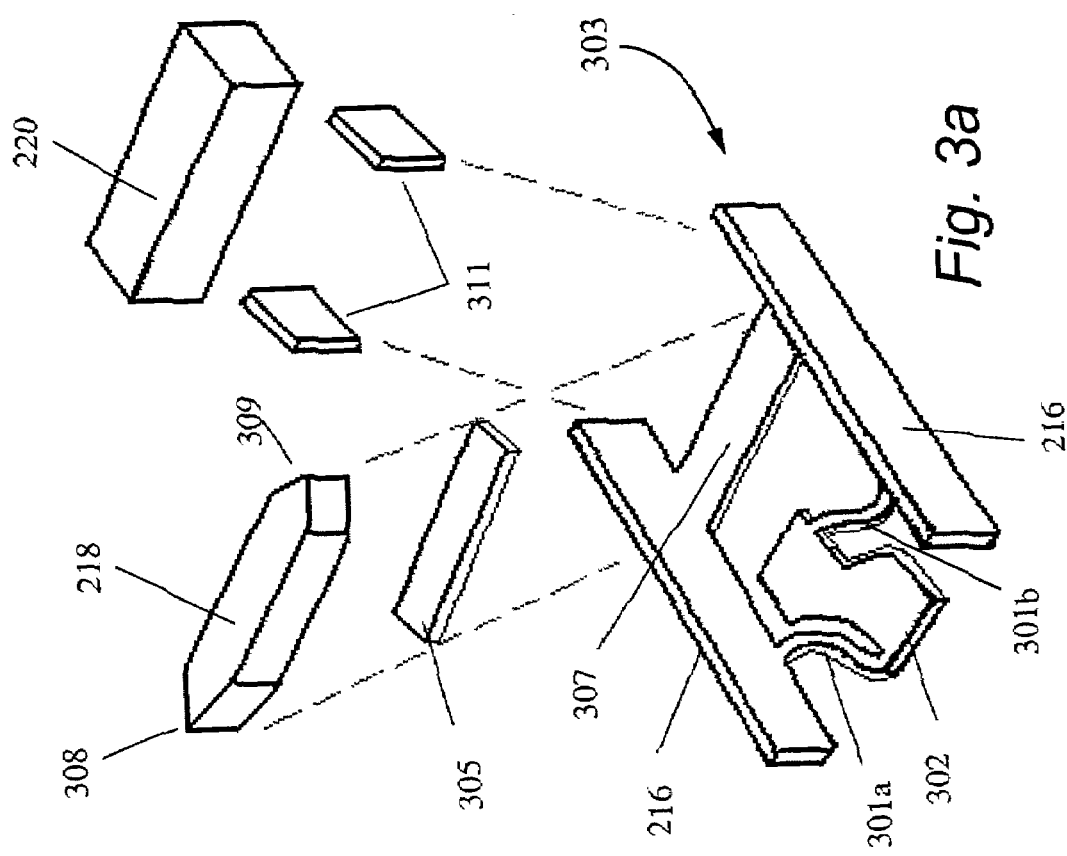
Fig. 3b
Fig. 3a

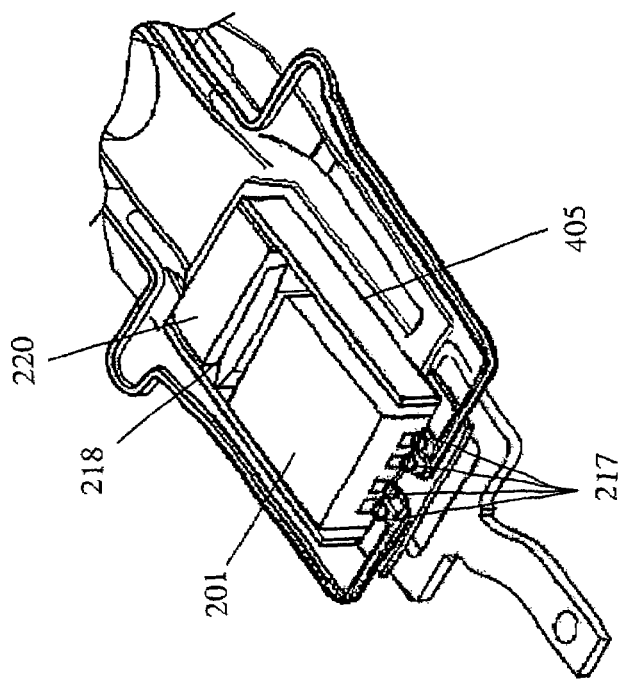
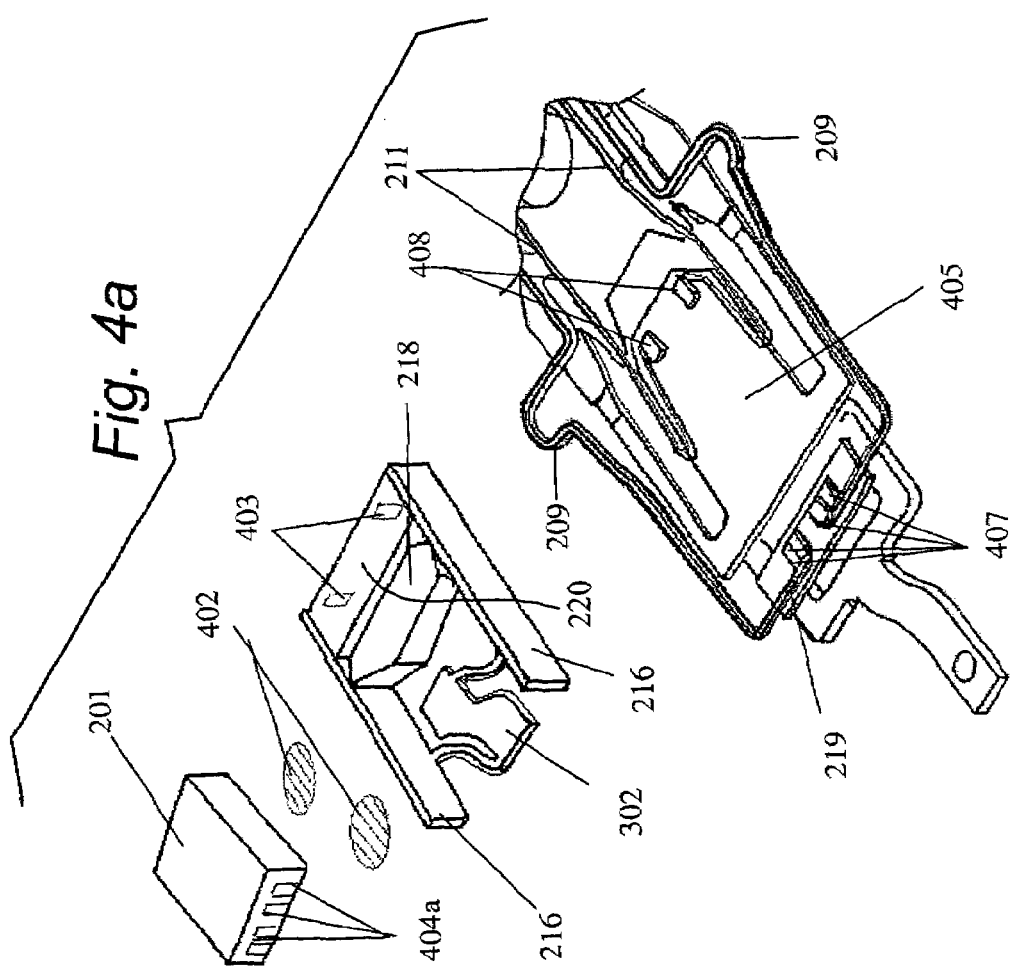
Fig. 4a
Fig. 4b

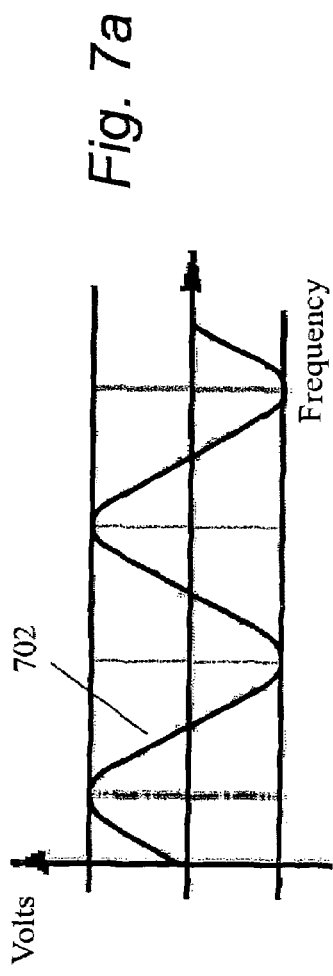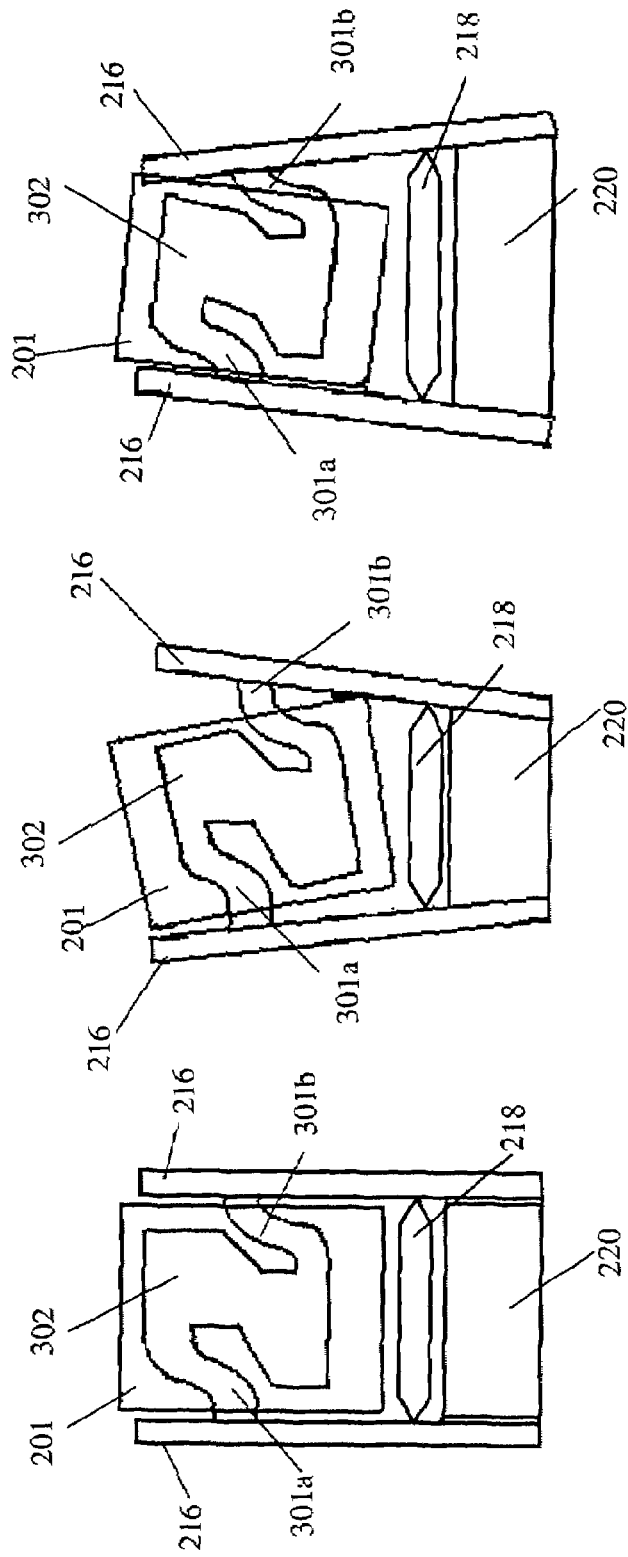
Fig. 7a
Fig. 7b
Fig. 7c
Fig. 7d

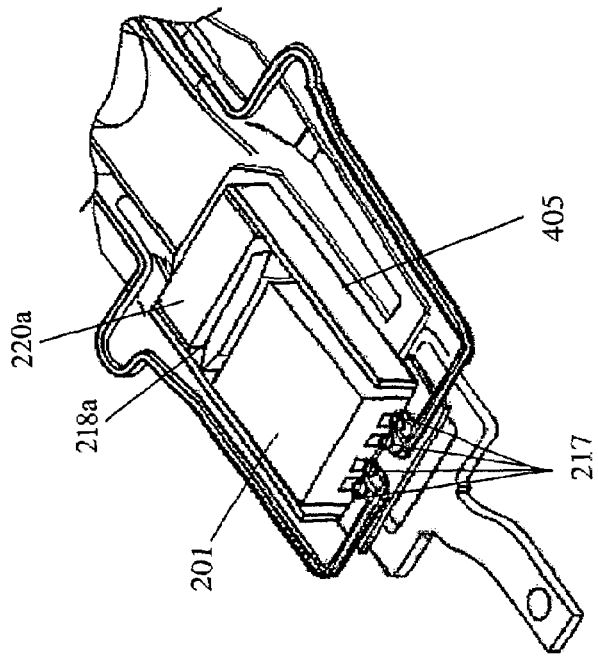
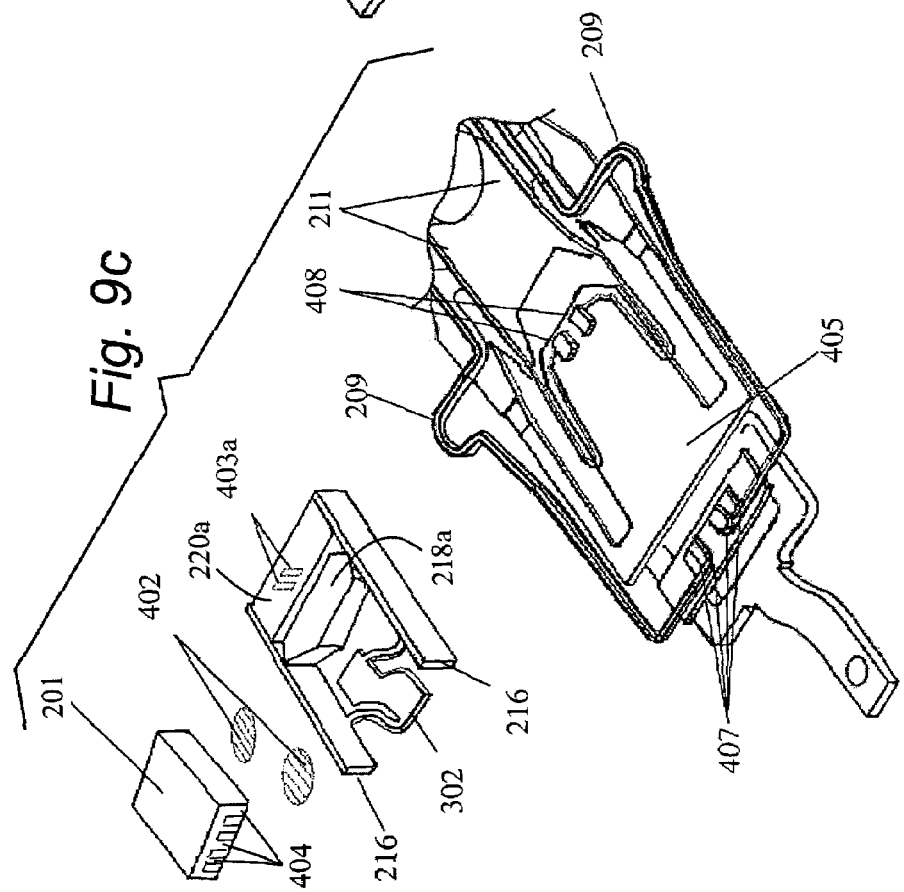

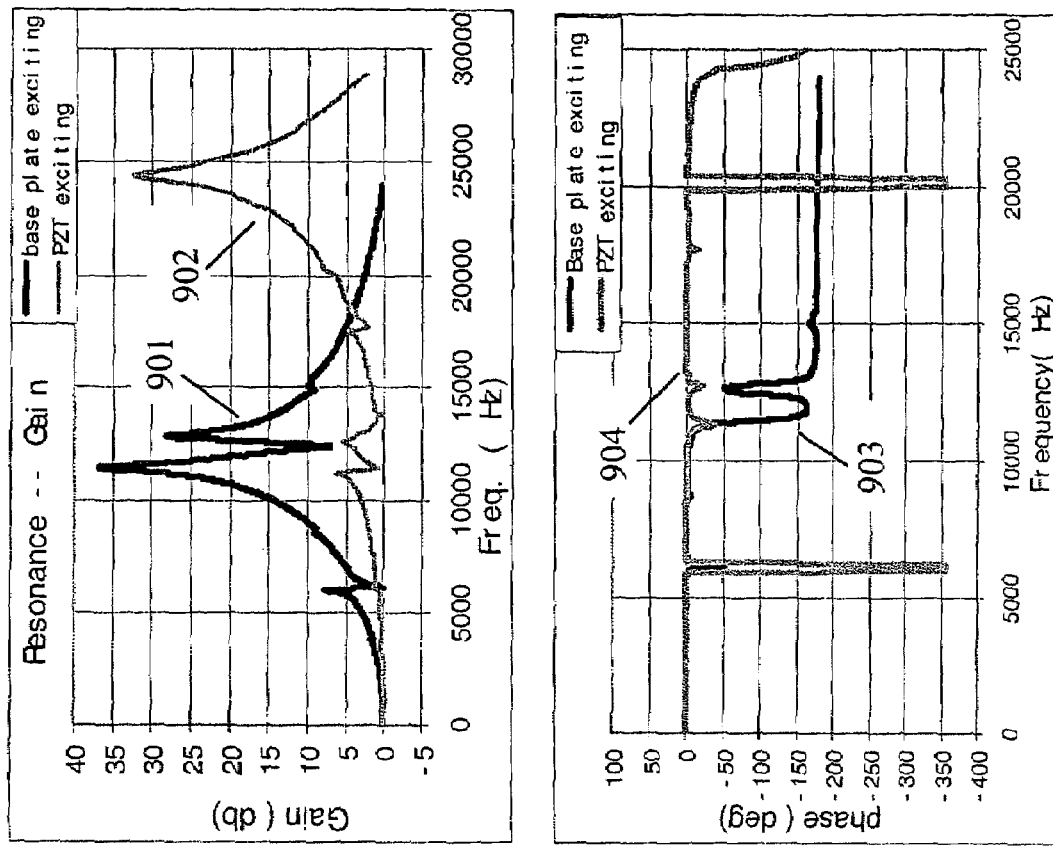
*Fig. 11a*
*Fig. 11b*
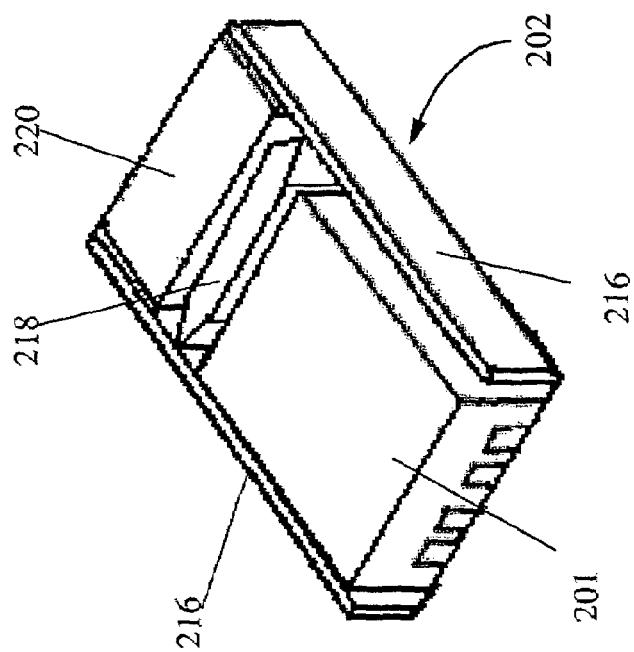
*Fig. 10*

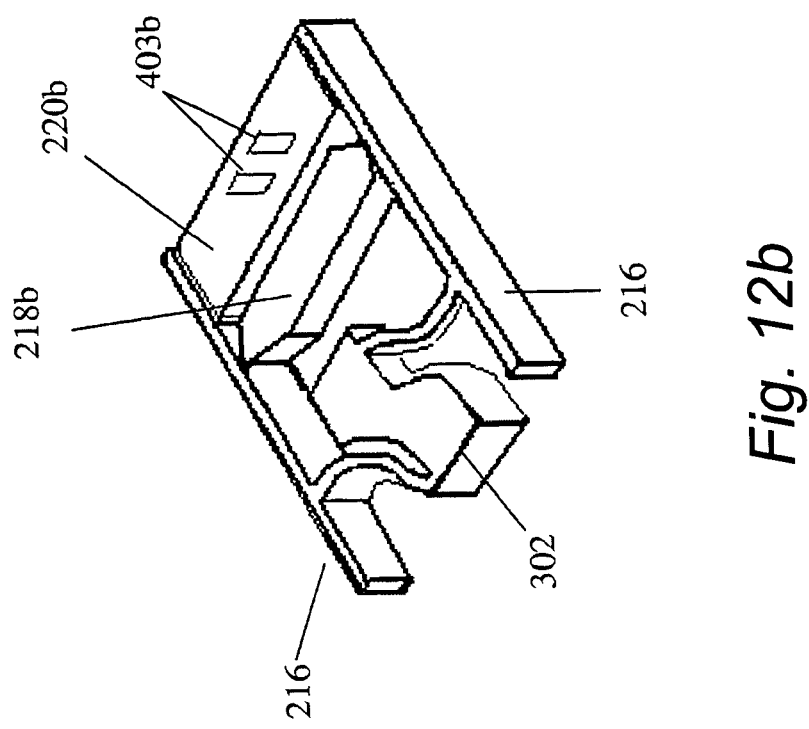
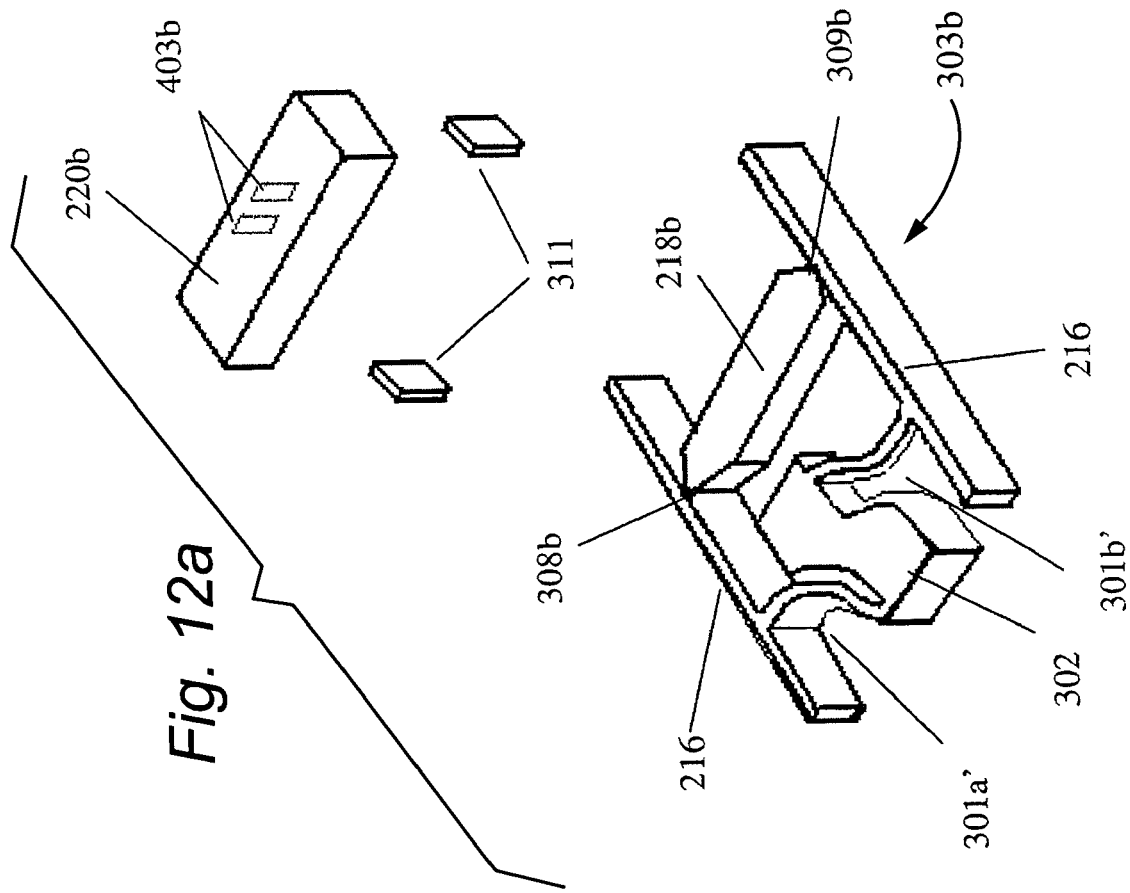
Fig. 12a
Fig. 12b

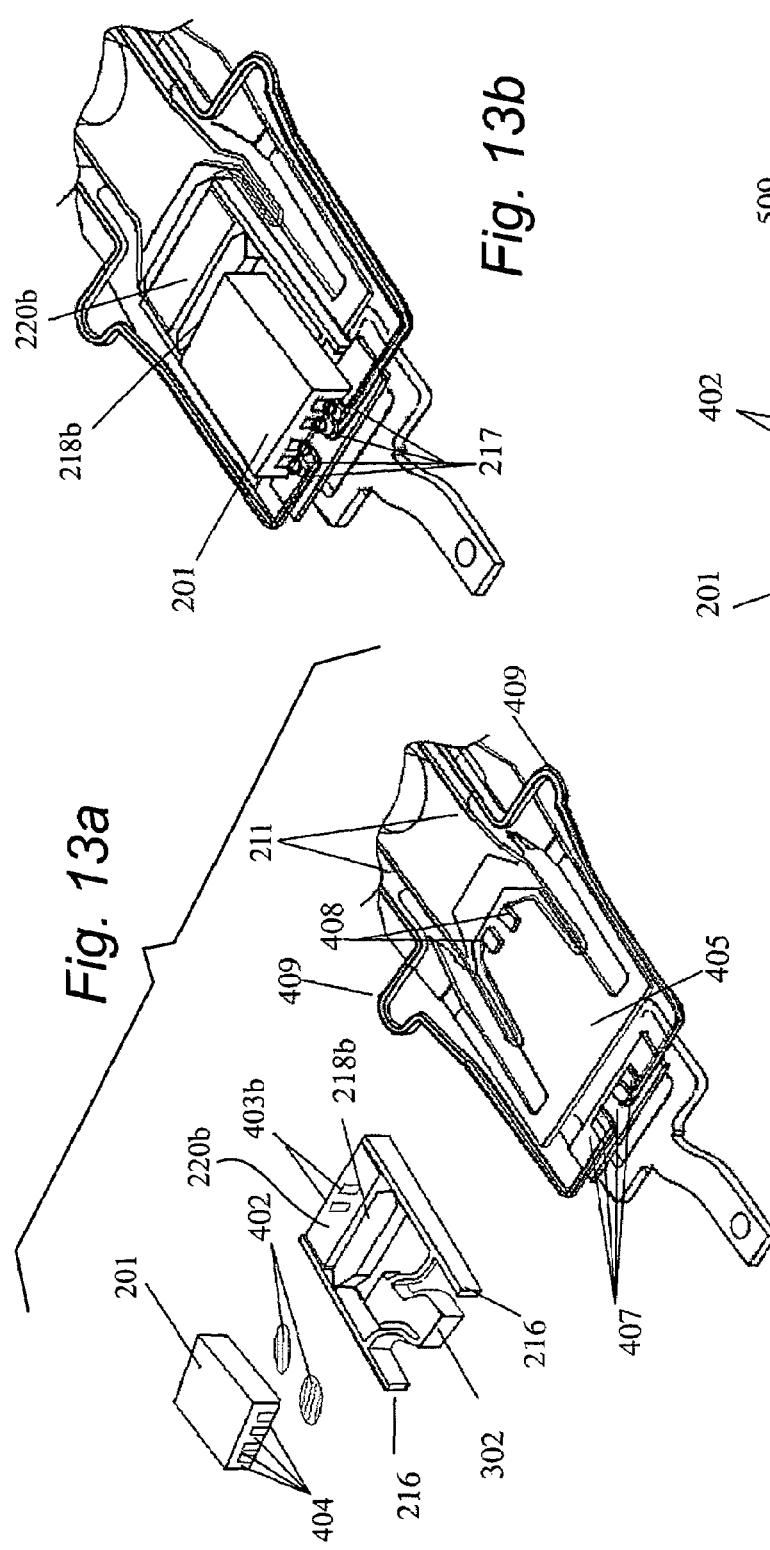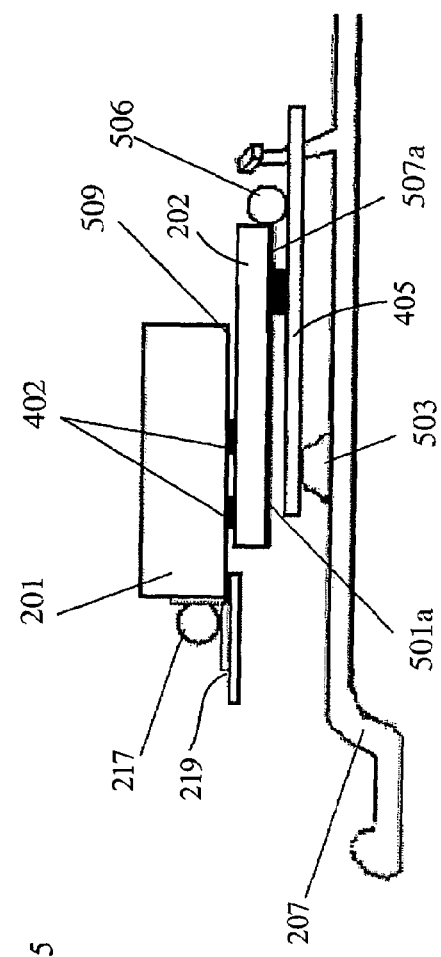
Fig. 13a
Fig. 13b
Fig. 13c

US 7,379,274 B2

ROTATIONAL PZT MICRO-ACTUATOR, HEAD GIMBAL ASSEMBLY, AND DISK DRIVE UNIT WITH THE SAME

FIELD OF THE INVENTION

The present invention relates to information recording disk drive units and, more particularly, to a rotational PZT micro-actuator, as well as a head gimbal assembly (HGA) and disk drive unit incorporating the rotational PZT micro-actuator. More specifically, the present invention is directed to an improved PZT micro-actuator for an HGA that enables a slider mounted on the micro-actuator to rotate in a manner that minimizes vibration caused by excitation of the micro-actuator when fine tuning the position of a read/write head.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the speed and fine tuning the position of the read/write head over the desired tracks on high density storage media. Such dual-stage actuator systems typically include a primary voice-coil motor (VCM) actuator and a secondary micro-actuator, such as a PZT micro-actuator. The VCM actuator is controlled by a servo control system that rotates the actuator arm that supports the read/write head to position the read/write head over the desired information track on the storage media. The PZT micro-actuator is used in conjunction with the VCM actuator for the purpose of increasing the positioning speed and fine tuning the exact position of the read/write head over the desired track. Thus, the VCM actuator makes larger adjustments to the position of the read/write head, while the PZT micro-actuator makes smaller adjustments that fine tune the position of the read/write head relative to the storage media. In conjunction, the VCM actuator and the PZT micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly."

FIG. 1a illustrates a portion of a conventional disk drive unit and shows a magnetic disk 101 mounted on a spindle motor 102 for spinning the disk 101. A voice coil motor arm 104 carries a head gimbal assembly 100 that includes a micro-actuator 105 and a read/write head 103. A voice-coil motor (VCM) is provided for controlling the motion of the motor arm 104 and, in turn, controlling the slider 103 to move from track to track across the surface of the disk, thereby enabling the read/write head to read data from or write data to the disk. In operation, a lift force is generated by the aerodynamic interaction between the slider, incorporating the read/write head, and the spinning magnetic disk. The lift force is opposed by equal and opposite spring forces applied by a suspension of the HGA such that a predetermined flying height above the surface of the spinning disk is maintained over a full radial stroke of the motor arm 104.

FIG. 1b illustrates the head gimbal assembly 100 (HGA) of the conventional disk drive device of FIG. 1a incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

As shown in FIGS. 1a and 1b, one known type of micro-actuator is a U-shaped micro-actuator 105. This U-shaped micro-actuator 105 has two side arms 107 that hold the slider 103 therebetween and displace the slider by movement of the side arms. However, movement of the side arms generates a reaction force in the mounting area that will be propagated to a suspension tongue and, in turn, to the suspension itself. The reaction force causes a suspension resonance, or vibration, that will negatively impact the dynamic performance of the HGA. The suspension resonance resulting from operation of the micro-actuator is one factor that limits the bandwidth of the disk drive device.

Referring more particularly to FIG. 1c, a conventional PZT micro-actuator 105 includes a ceramic U-shaped frame which has two ceramic beams or side arms 107 each having a PZT element thereon. With reference to FIGS. 1b and 1c, the PZT micro-actuator 105 is physically coupled to a flexure 114. Three electrical connection balls 109 (gold ball bonding or solder ball bonding, GBB or SBB) are provided to couple the micro-actuator 105 to the suspension traces 110 located at the side of each of the ceramic beams 107. In addition, there are four metal balls 108 (GBB or SBB) for coupling the slider 103 to the traces 110.

FIG. 1d generally shows an exemplary process for assembling the slider 103 with the micro-actuator 105. As shown in FIG. 1d, the slider 103 is partially bonded with the two ceramic beams 107 at two predetermined positions 106 by epoxy 112. This bonding makes the movement of the slider 103 dependent on the movement of the ceramic beams 107 of the micro-actuator 105. A PZT element 116 is attached on each of the ceramic beams 107 of the micro-actuator to enable controlled movement of the slider 103 through excitation of the PZT elements. More particularly, when power is supplied through the suspension traces 110, the PZT elements expand or contract to cause the two ceramic beams 107 of the U-shape micro-actuator frame to deform, thereby making the slider 103 move on the track of the disk in order to fine tune the position of the read/write head. In this manner, controlled displacement of slider 103 can be achieved for fine positional tuning. FIG. 1e illustrates the micro-actuator and slider after being assembled as shown in FIG. 1d. FIG. 1e also shows the two possible translational movements, illustrated by arrows 117a and 117b, that the micro-actuator can produce upon excitation, as well as the resulting reaction forces (118a and 118b, respectively) generated in the base-part plate of the micro-actuator as a result of the translational movement.

While the PZT micro-actuator described above provides an effective and reliable solution for fine tuning the position of the slider, it also results in certain disadvantages. More particularly, because the PZT micro-actuator 105 and the slider 103 are mounted on the suspension tongue, a suspension resonance is generated, as a result of, for example, the reaction forces 118a and 118b, when the PZT micro-actuator 105 is excited. In other words, the translational motion of the micro-actuator used to displace the slider 103, combined with the weight of the slider and micro-actuator, causes a vibration in the suspension due to the structure and constraint of the U-shaped frame of the micro-actuator. This suspension vibration resonance resulting from operation of the micro-actuator has the same effect as the resonance of the shaking suspension base plate which will cause the slider to be off-track when the head reads data from or writes data to the magnetic disk, thereby limiting the servo bandwidth and the capacity improvement of the disk drive device.

FIG. 1f shows a graph of the resonance gain verses frequency for both the excited base plate and excited PZT element on the micro-actuator. As shown in FIG. 1f, the numeral 201 represents a resonance curve when the suspension base plate is excited and numeral 202 represents a resonance curve when the micro-actuator 105 is excited. The graph of FIG. 1f shows that under a frequency of 20 kHz, there are several large peaks and valleys in the suspension frequency response which demonstrate an adverse resonance characteristic for the device. In addition to the vibration problems, the ceramic U shaped micro-actuator of the prior art is subject to damage or malfunction when exposed to mechanical shock. In addition, the alignment and mounting procedures for the two PZT elements on the prior art micro-actuators are very complex.

Thus, there is a need for an improved micro-actuator for use in head gimbal assemblies and disk drive units that does not suffer from the above-mentioned vibration problems, yet still enables fine tuning of the read/write head.

SUMMARY OF THE INVENTION

A main feature of the present invention is to provide an improved micro-actuator and head gimbal assembly that enables fine head position adjustments and provides improved resonance characteristics.

Another feature of the present invention is to provide an improved micro-actuator structure that minimizes vibration and that can be easily and effectively incorporated into a head gimbal assembly.

Another feature of the present invention is to provide an improved disk drive unit with a large servo bandwidth and storage capacity, as well as fine head position adjustment using a micro-actuator.

Another feature of the present invention is to provide a micro-actuator that includes only one PZT element.

Another feature of the present invention is to provide a micro-actuator that causes rotation, rather than translation, of the slider upon micro-actuator excitation.

Another feature of the present invention is to provide a micro-actuator that has improved mechanical shock performance.

Another feature of the present invention is to provide a micro-actuator having a frame that can be made from metal, such as stainless steel.

Another feature of the present invention is to provide a micro-actuator that is less complicated and less expensive to manufacture as compared to prior art micro-actuators.

To achieve the above-mentioned features, a micro-actuator for a head gimbal assembly is provided, in accordance with one embodiment of the invention, that includes a pair of actuator side arms, a PZT element extending between and connecting the actuator side arms, a rotatable plate positioned between the actuator side arms, and a pair of connection elements that connect the rotatable plate to the actuator side arms, respectively. The rotatable plate rotates in a first direction when the PZT element contracts and a second direction when the PZT element expands. Thus, when a slider is mounted on the rotatable plate, the slider can be selectively rotated to make fine head position adjustments with significantly less resulting vibration as compared to prior art micro-actuators. The micro-actuator of the invention enables a single PZT element to be used for right or left rotation of the slider with minimal impact on resonance performance. The micro-actuator is preferable made from metal, such as stainless steel. The use of metal for the micro-actuator frame improves the mechanical shock performance of the device and enables laser welding, rather than epoxy bonding, to be used when connecting the micro-actuator to a suspension, such as a CIS or TSA suspension.

A head gimbal assembly in accordance with another embodiment of the invention includes a slider, a rotatable micro-actuator as described herein having the slider mounted on the rotatable plate thereof, and a suspension to load the slider and the micro-actuator. The frame of the micro-actuator is preferably made of metal, such as the stainless steel. However, ceramic (such as the zirconia), silicon, polymer or any other suitable material(s) may be used. The piezoelectric element is preferably a thin film piezoelectric element or a ceramic piezoelectric element.

A disk drive unit in accordance with another embodiment of the present invention comprises a head gimbal assembly, a drive arm to connect with the head gimbal assembly, a disk, and a spindle motor to spin the disk.

The head gimbal assembly includes a slider, a rotatable PZT micro-actuator as described herein having the slider mounted on the rotatable plate thereof, and a suspension to load the slider and the micro-actuator. The micro-actuator adjusts the position of the slider by rotation of the rotatable plate through excitation of the single PZT element.

In accordance with the invention, the rotatable plate of the micro-actuator and the connection arms that connect to rotatable plate to the micro-actuator side arms can have a variety of shapes, forms and/or configurations. Thus, the invention is not limited to any particular shape, form or configuration shown or discussed herein, as long as the shape, form and/or configuration enables the plate to selectively rotate upon excitation of the PZT element. The rotatable plate of the invention, combined with the weight distribution that the structure of the instant micro-actuator provides, enables the resonance characteristic of the suspension to be significantly improved, which, in turn, enables a larger servo bandwidth and improved capacity for disk drive devices.

These and other features and advantages of the instant invention will be further understood by the following description of various exemplary embodiments of the invention and with reference to the appended drawings, in which:

DESCRIPTION OF THE DRAWINGS

FIG. 1b is a perspective view of a conventional HGA;

FIG. 1c is an enlarged, partial view of the HGA of FIG. 1b;

FIG. 1d illustrates a general process of inserting a slider into the micro-actuator of the HGA of FIG. 1b;

FIG. 1e shows an assembled micro-actuator and slider of the prior art;

FIG. 1f shows resonance curves for the HGA of FIG. 1b;

FIG. 2a is a perspective view of an HGA incorporating a rotational micro-actuator, in accordance with a first embodiment of the present invention;

FIGS. 2b and 2c are enlarged, partial perspective views of the HGA of FIG. 2a;

FIG. 3a is an exploded view of the rotational micro-actuator in accordance with a first embodiment of the invention;

FIG. 3b is an assembled view of the rotational micro-actuator of FIG. 3a;

FIG. 4a is an exploded view of the HGA of FIG. 2a;

FIG. 4b is an assembled view of the HGA of FIG. 4a;

FIG. 7a shows an exemplary voltage waveform which is applied to the PZT element of the micro-actuator of the instant invention;

FIG. 7b shows a top view of the micro-actuator and slider in a mode where no voltage is applied to the PZT element;

FIG. 7c shows a top view of the micro-actuator and slider in a mode where a positive voltage is applied to the PZT element;

FIG. 7d shows a top view of the micro-actuator and slider in a mode where a negative voltage is applied to the PZT element;

FIG. 9b shows an assembled view of the micro-actuator of FIG. 9a;

FIG. 9c shows an exploded view of an HGA incorporating the second embodiment of the instant invention;

FIG. 9d shows an assembled view of the HGA of FIG. 9c;

FIG. 10 is a perspective view of an exemplary micro-actuator and slider in accordance with the instant invention;

FIGS. 11a and 11b show resonance test results for the instant invention;

FIG. 12a shows an exploded view of a third embodiment of the micro-actuator of the instant invention;

FIG. 12b shows an assembled view of the micro-actuator of FIG. 12a;

FIG. 13a shows an exploded view of an HGA incorporating the micro-actuator of FIG. 12b;

FIG. 13b shows an assembled view of the HGA of FIG. 13a;

FIG. 13c shows a side view of the HGA of FIG. 13b;

DETAILED DESCRIPTION OF THE PREFERRED EMBODIMENTS

Figure 1A:
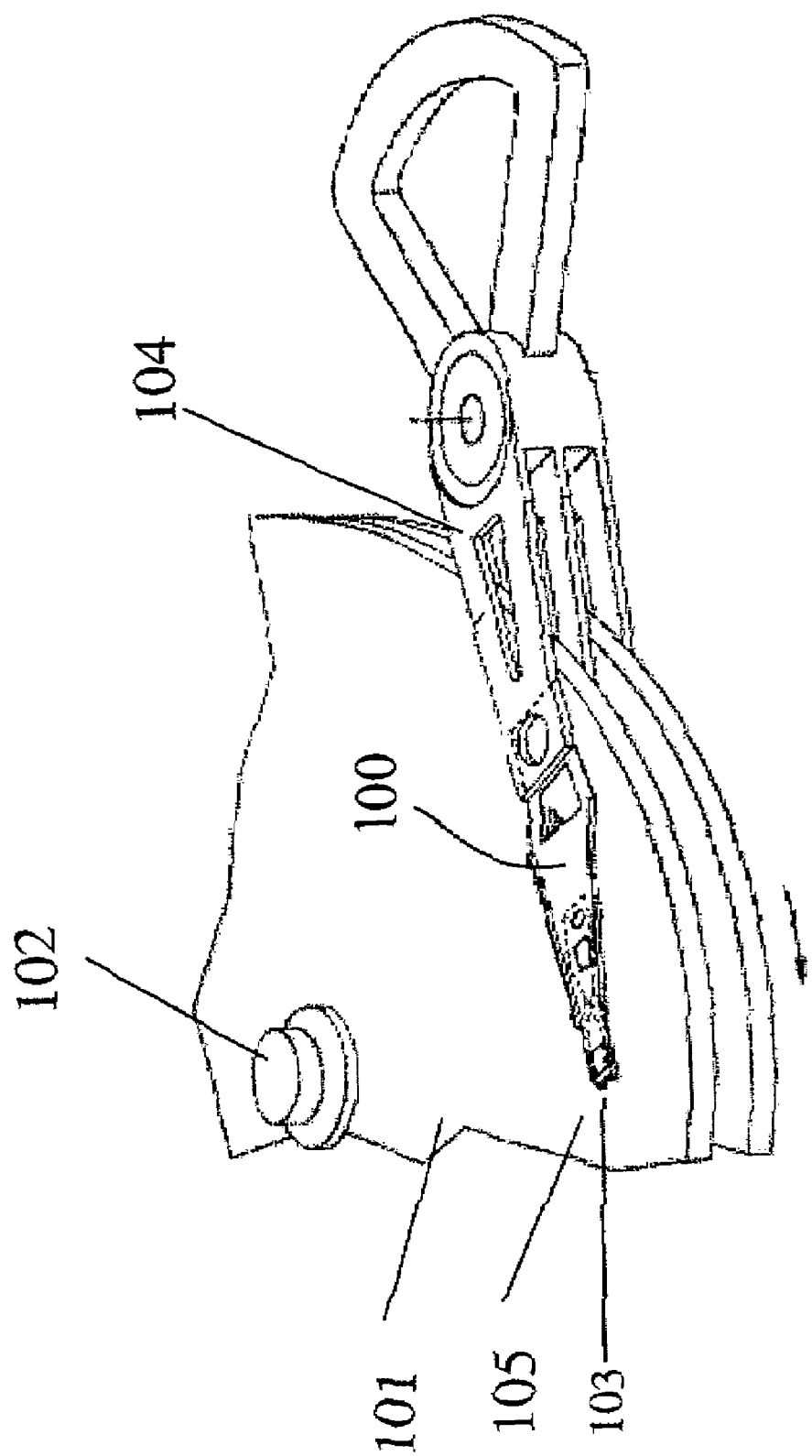
FIG. 1a shows a partial view of a conventional disk drive unit.

Various preferred embodiments of the instant invention will now be described with reference to the figures, wherein like reference numerals designate similar parts throughout the various views. As indicated above, the instant invention is designed to eliminate, or at least reduce, a vibration that is propagated to an HGA suspension from a micro-actuator when the micro-actuator having a PZT element is excited for the purpose of fine tuning the position of the read/write head. A primary aspect of the instant invention is to provide a rotational micro-actuator, preferably having only a single PZT element, that enables a slider to rotate, rather than translate, when the micro-actuator is actuated in order to minimize vibration. By minimizing the vibration caused by the micro-actuator, the resonance characteristics of the device are improved, which advantageously enables a larger servo bandwidth and increased storage capacity for the disk drive device.

Several example embodiments of rotational PZT micro-actuator of the invention will now be described. Some of the example embodiments are illustrated in the figures and described as being implemented in a conventional HGA of the type described above in connection with FIGS. 1b and 1c. However, it is noted that the invention is not limited to such implementations. Instead, the rotational PZT micro-actuator of the invention can be implemented in any suitable disk drive device having a micro-actuator in which it is desired to improve the resonance characteristics, regardless of the specific structure of the HGA.

FIG. 2a shows a head gimbal assembly (HGA) incorporating a first exemplary embodiment of the rotational PZT micro-actuator of the present invention. This first embodiment is shown in FIG. 2a as being implemented in a conventional HGA of the type shown in FIGS. 1b and 1c. As explained above, this type of conventional HGA includes a slider 201, a micro-actuator 202 and a suspension 8 to load the slider 201 and the micro-actuator 202. The suspension 8 includes a load beam 207, a flexure 203, a hinge 205 and a base plate 208. A hole 212 is provided in the hinge 205 for use in connecting the suspension 8 to a drive arm (not shown) of the disk drive device. The hole 215 is provided in order to reduce the weight of the suspension by removing unnecessary material. The load beam 207 has a dimple 503 (see FIG. 5) formed thereon. On the flexure 203, a plurality of connection pads 213 are provided to connect with a control system (not shown) at one end and a plurality of electrical multi-traces 209, 211 are provided at the other end. Traces 209 provide electrical connection for the slider, while traces 211 provide electrical connection for the PZT element 220 on the micro-actuator. A voice-coil motor (VCM) is provided in the disk drive device for controllably driving the drive arm and, in turn, the HGA in order to enable the HGA to position the slider, and associate read/write head, over any desired information track on a disk in the disk drive device. As explained above, a micro-actuator 202 is provided to enable faster and finer positional control for the device, as well as to reduce the head seeking and settling time during operation. Thus, when the HGA is incorporated into a disk drive device, a dual-stage actuator system is provided in which the VCM actuator provides large positional adjustments and the micro-actuator 202 provides fine positional adjustments for the read/write head.

FIG. 2b shows an enlarged partial view of the HGA of FIG. 2a, wherein details of the rotational PZT micro-actuator of this embodiment of the invention can be more clearly seen. The micro-actuator of this embodiment includes two actuator side arms 216, a PZT element 220 mounted between the two side arms 216, and a rigid beam 218 extending between the two side arms 216 and located between the PZT element 220 and the slider 201. Four connection pads are provided on the suspension moving plate 219 (located on the back side of the slider 201) which are coupled to pads 213 through traces 209. The slider 201 has a plurality of connection pads on an end thereof corresponding to the electrical connection pads of the moving plate 219. The connection pads on the moving plate 219 are electrically connected to the connection pads on the slider 201 using, for example, electric connection balls 217 (GBB or SBB).

FIG. 2c shows a reverse perspective view of the HGA portion shown in 2b. This view shows the traces 211 electrically connected to the PZT element 220 of the rotational micro-actuator using electric balls 222 (e.g., GBB or SBB). The other end of the traces 211 are connected to the suspension pads 213 which, in turn, are connected with a drive control system (not shown). A limiter 226 on the load beam is also shown in FIG. 2c and is used to limit the movement of the suspension tongue during loading or unloading processes or in the event of a mechanical shock or vibration to the suspension or the disk drive device.

FIG. 3a shows a more detailed view (in exploded form) of the rotational micro-actuator in accordance with the first embodiment of the invention shown in FIGS. 2a-2c. In this embodiment, the micro-actuator includes a support frame 303 having a pair of actuator side arms 216, a bottom plate 307 connected between the side arms 216, a rotatable plate 302, and a pair of connection arms or bridges 301a, 301b that respectively connect the rotatable plate 302 to the side arms 216. The support frame 303 is preferably made of metal, such as stainless steel. However, the support frame 303 may alternatively be made of ceramic (e.g., zirconia), silicon, polymer or any other suitable material.

A rigid beam 218, preferably having two pointed end portions 308, 309, is mounted on the bottom plate 307 using, for example, an epoxy strip 305. The end portions of the rigid beam may have other shapes as well, such as flat, rounded or any other suitable shape. A PZT element 220 is mounted at one end of the frame and oriented to extend between the two side arms 216 and connect therewith using epoxy dots 311. The PZT element is preferably a block of ceramic or thin film PZT. The PZT element may be either single layer or multi-layer PZT.

FIG. 3b shows the assembled rotational PZT micro-actuator of FIG. 3a. As can be seen in FIG. 3b, the two side arms 216 maintain a generally parallel configuration in their normal mode (i.e., without voltage applied to the PZT element 220). In addition, the two pointed ends 308 and 309 of the rigid beam 218 contact the respective side arms 216 and provide a pivot point for the side arms 216 when the PZT element 220 expands or contracts when excited. In other words, when the PZT element 220 expands the two side arms will be pushed outwardly at the location of the PZT element. This outward movement at one end of the side arms causes the other end of the side arms to pivot inwardly (i.e., toward each other) around points 308, 309 of the rigid beam. The rotatable plate is connected with the side arms in a manner that causes rotation thereof when the distance between the two side arms is changed (shortened or lengthened). The rotation is achieved through the design of the connection arms or bridges 301a, 301b. These connection arms 301a, 301b can be straight or curved but are configured relative to each other such that squeezing the side arms together causes rotation in one direction and expanding the side arms apart causes rotation in the opposite direction. Thus, by selectively actuating the PZT element to expand or contract, the amount of rotation and the direction of rotation of the rotatable plate can be controlled, thereby providing a rotational micro-actuator for an HGA having a single PZT element. Thus, the shape and configuration of the rotatable plate and connection arms can have a variety of forms, as long as they are operable to achieve the rotation functionality described above.

The connection arms 301a, 301b are flexible and resilient, and are preferably designed, together with the rotatable plate 302, to cause the rotatable plate to rotate about its central axis. In addition, regardless of the specific shape (e.g., straight, curved, etc.) of the connection arms 301a, 301b, the connection arms are preferably configured relative to each other such that they are symmetrical about a longitudinal axis or a center of gravity of the rotatable plate 302. In the preferred embodiment, the distances are the same between the rigid beam 218 and the connection points where each of the connection arms 301a, 301b connect with their respective side arms 216. The configuration of the connection arms 301a, 301b preferably enable the connection arms to exhibit an elastic behavior, i.e., the connection arms return to a neutral position (a position where the rotatable plate is in a non-rotated position) when no expansion or contraction forces are applied thereto by the side arms 216.

As will be explained in greater detail below, a slider is preferably mounted on the rotatable plate with its central axis aligned with the central axis of the rotatable plate. It is noted that the term "plate" as used herein is not meant to be limited to any particular shape, as long as it is suitably shaped for having a slider mounted thereon.

FIG. 4a shows an exemplary assembly process for incorporating the rotational PZT micro-actuator of FIG. 3b into an HGA. A magnetic slider 201 is mounted on the rotatable plate 302 of the micro-actuator using, for example, two dots of epoxy 402. Two electric pads 403 are provided in the PZT element 220 which correspond to suspension pads 408 in the suspension tongue 405. Two electric balls (not show) are used to electrically couple the PZT element 220 of the micro-actuator and the suspension trace 211 through pads 408. The bottom plate 307 of the micro-actuator (with slider therein) is partially bonded on the suspension tongue 405 in a manner that enables the slider to smoothly rotate when the PZT element 220 is operated. The suspension tongue 405 is preferably configured to maintain the loading force on the center area of the slider through the dimple 503 (see FIG. 5) of the load beam 207. At least four electric pads 407 are provided in the moving plate 219 of the suspension tongue 405, which correspond with the electric pads 404 of the slider 201. Electric balls 217 (e.g., GBB or SBB) electrically couple the slider with the suspension traces 209, thereby enabling the read/write head of the slider to be controlled by the drive control system. FIG. 4b shows the HGA of FIG. 4a after assembly. In an alternative embodiment of the assembly process, the micro-actuator may be mounted on the suspension prior to having the slider inserted in and connected therewith. One advantage of the invention is that very little modifications need to be made to a conventional HGA to incorporate the rotational PZT micro-actuator of the present invention therein.

Figure 5:
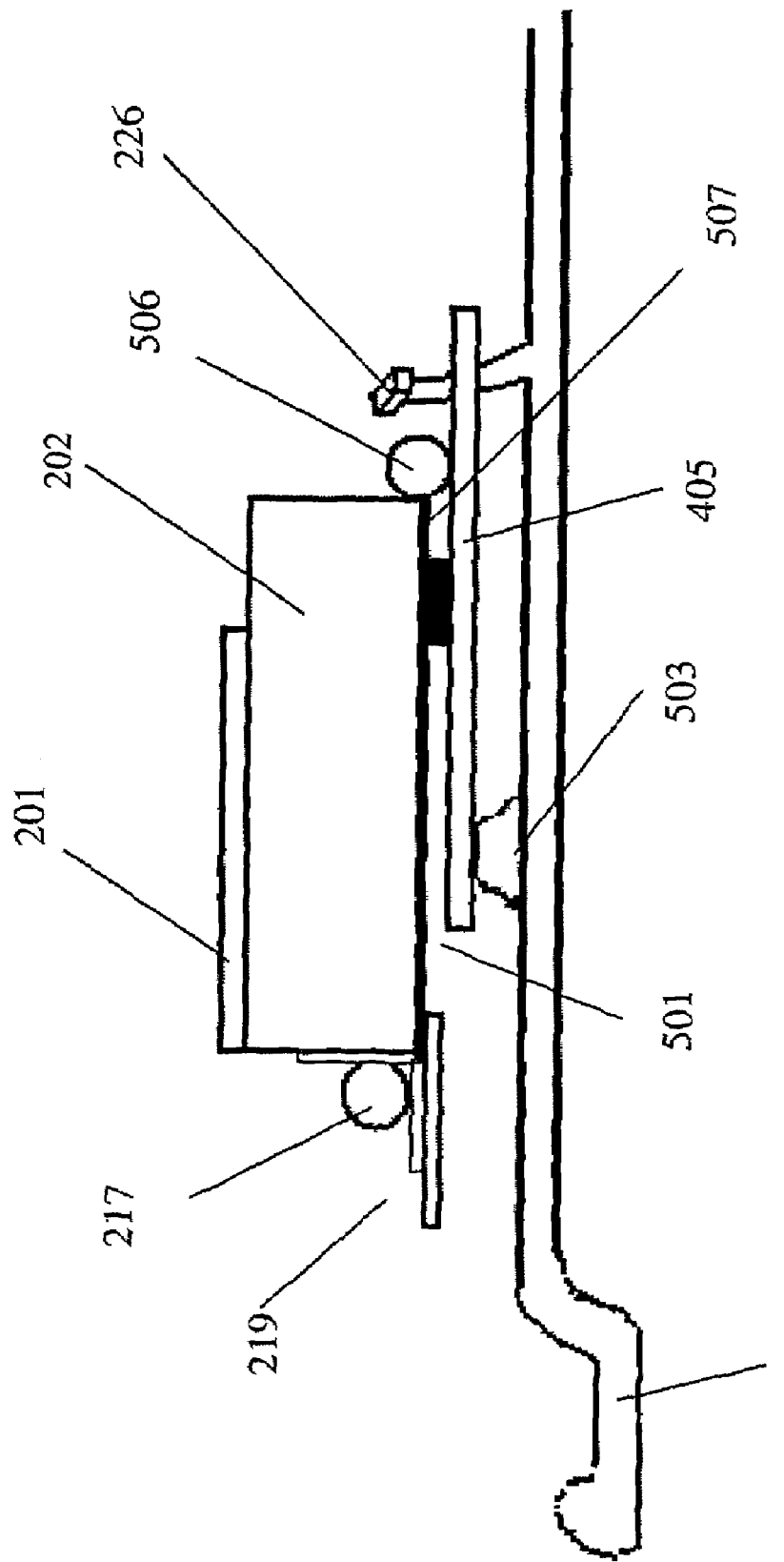
FIG. 5 is a side view of the HGA of FIG. 4b.

FIG. 5 shows a side view of the HGA tongue region in accordance with a preferred embodiment of the invention. As shown in FIG. 5, a dimple 503 in the load beam 207 of the HGA supports the suspension tongue 405. The rotational PZT micro-actuator 202 with slider 201 is partially mounted on the suspension tongue 405, via bottom plate 307. Electric balls 506 (e.g., GBB or SBB) are used for electrical connection of the PZT element 220, and electric balls 217 are used for electrical connection of the slider 201. Parallel gaps 501, 507 exist on the two sides of the partial mounting region. The first gap 501 enables the slider to rotate freely when driving the PZT element 220 of the micro-actuator. The other gap 507 enables the PZT element 220 to freely expand and contract when a voltage is input to the PZT element. The gaps also prevent vibration from propagating to the suspension when the micro-actuator is operated.

Figure 6:
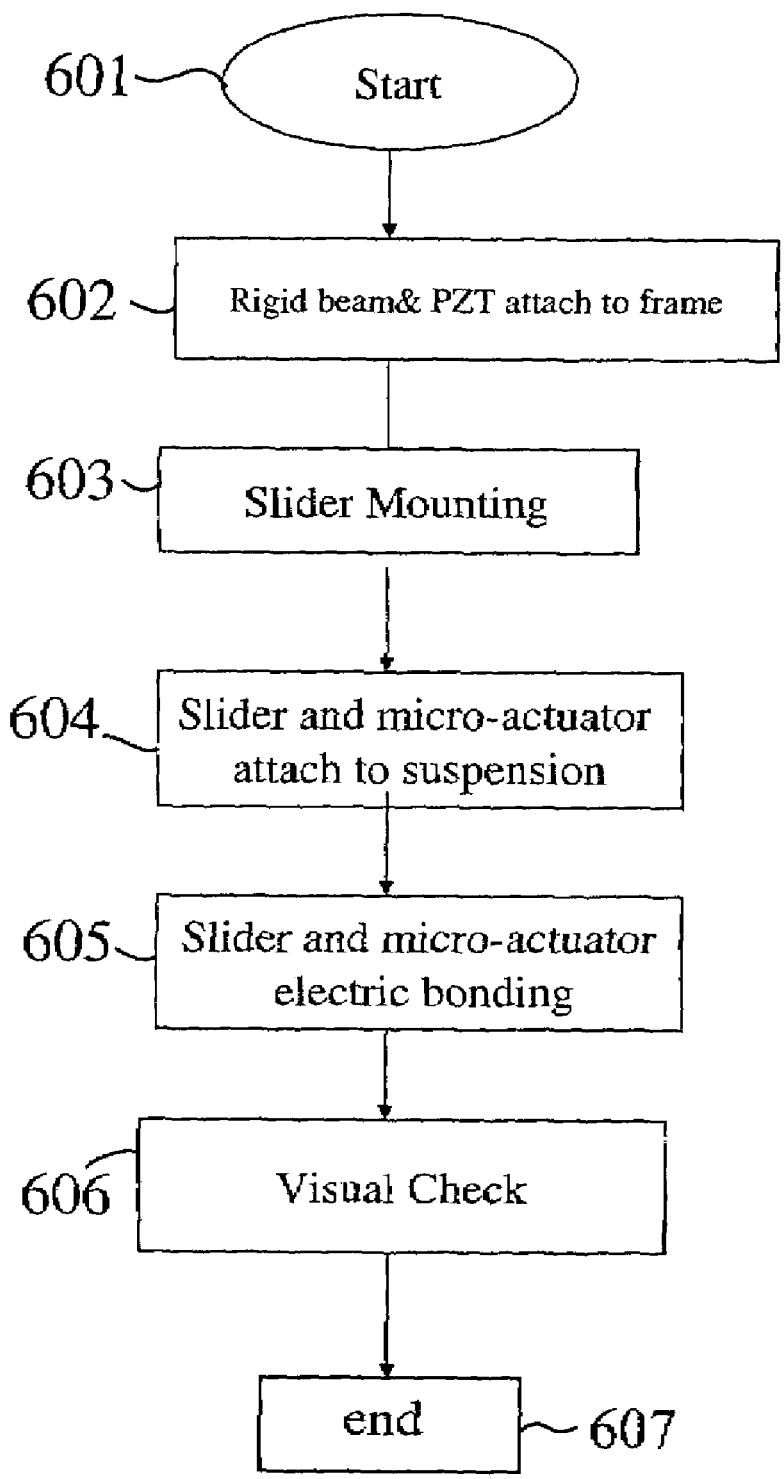
FIG. 6 is flow chart illustrating the preferred manufacturing process for the first embodiment of the instant invention.

FIG. 6 provides a general flow chart that illustrates the preferred and primary steps involved in the manufacturing and assembly process described above in connection with the rotatable PZT micro-actuator of the instant invention. More specifically, after the process starts (step 601), the rigid beam and PZT element are attached to the micro-actuator frame (step 602). Then, the slider is mounted in the micro-actuator (step 603). Preferably the slider is mounted on the rotatable plate such that their respective central axes are aligned. This will enable any resulting vibration from actuation of the micro-actuator to be minimized. In addition, the location of the PZT element 220 is preferably at a weight balanced location relative to the suspension connection (as shown in the embodiments herein), which further reduces vibration from excitation of the PZT element. Next, the slider and micro-actuator are attached to the suspension (step 604), and are electrically connected to the suspension as described above (step 605). Preferably, the combined weight of micro-actuator and slider is well balanced on the suspension. A visual inspection (step 606) is preferable done to assure proper assembly prior to completion of the assembly process (step 607). The steps shown in FIG. 6 and the specific order of the steps can be changed and/or supplemented as one skilled in the art will readily understand from the description of the invention herein.

Figure 8A:
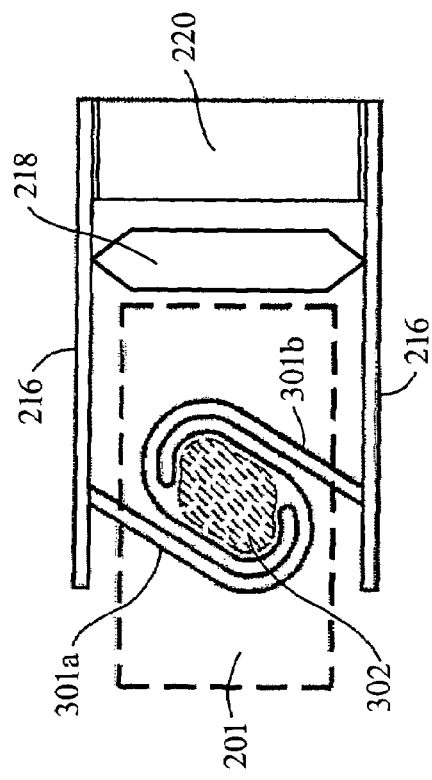
FIGS. 8a-8c show three exemplary, alternative configurations for the rotational portion of the micro-actuator of the instant invention.
Figure 8B:
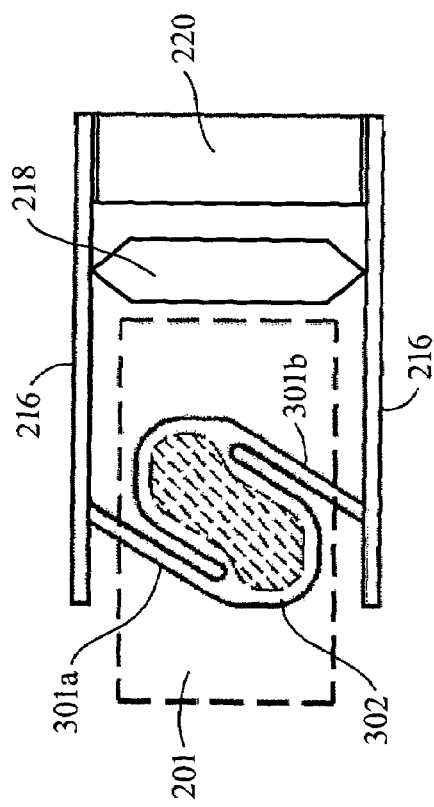
Figure 8C:
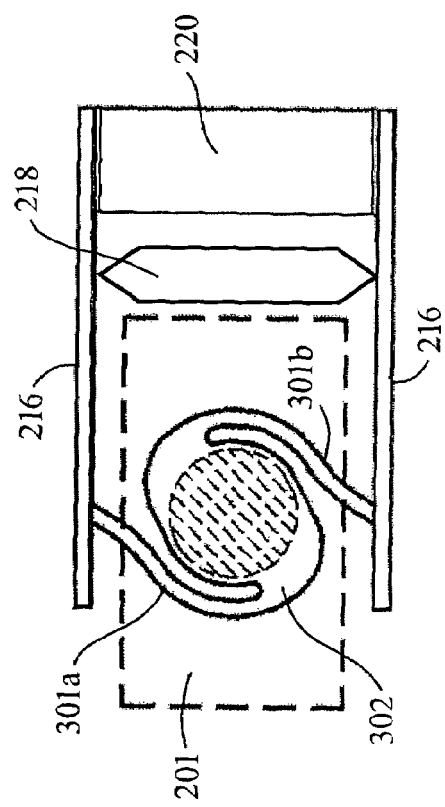

FIG. 7a shows an exemplary operation voltage (sine wave 702) that can be used to drive the PZT element 220 of the rotational PZT micro-actuator of the invention. FIG. 7b shows a first mode for the rotational PZT micro-actuator of the invention that exists when no voltage is applied to the PZT element 220. As explained above, in this normal mode, the side arms 216 remain generally parallel, and the rotatable plate 302 and slider 201 remain in a straight or non-rotated position. FIG. 7c shows a second mode for the micro-actuator in which the PZT element has contracted as a result of applied voltage, e.g., the second half period of the voltage sign wave 702 of FIG. 7a. As a result of this PZT contraction, the side arms 216 will pivot inwardly on one side of the rigid beam 218 and outwardly on the other side of the rigid beam. Thus, in this mode, the side arms 216 pivot outwardly relative to each other at the location of the rotatable plate. As a result, the rotatable plate will rotate to the left, thereby causing the slider to also rotate to the left. FIG. 7d shows a third mode for the micro-actuator in which the PZT element has expanded as a result of applied voltage, e.g., the first half period of the voltage sign wave 702 of FIG. 7a. As a result of this PZT expansion, the side arms 216 will pivot outwardly on one side of the rigid beam 218 and inwardly on the other side of the rigid beam. Thus, in this mode, the side arms 216 pivot inwardly relative to each other at the location of the rotatable plate. As a result, the rotatable plate will rotate to the right, thereby causing the slider to also rotate to the right. Thus, as illustrated in FIGS. 7b-7d, the rotational PZT micro-actuator of the invention enables the slider to be controllably rotated in an effective and efficient manner by selectively applying specific voltage to the PZT element. FIGS. 8a-8c illustrate three alternative shapes for the rotatable plate 302 and the connection arms 301a, 301b. Again, these are just exemplary embodiments and various other shapes and configurations for the rotatable plate and connection arms may be used, as one skilled in the art will readily understand from the description of the invention herein.

Figure 9B:
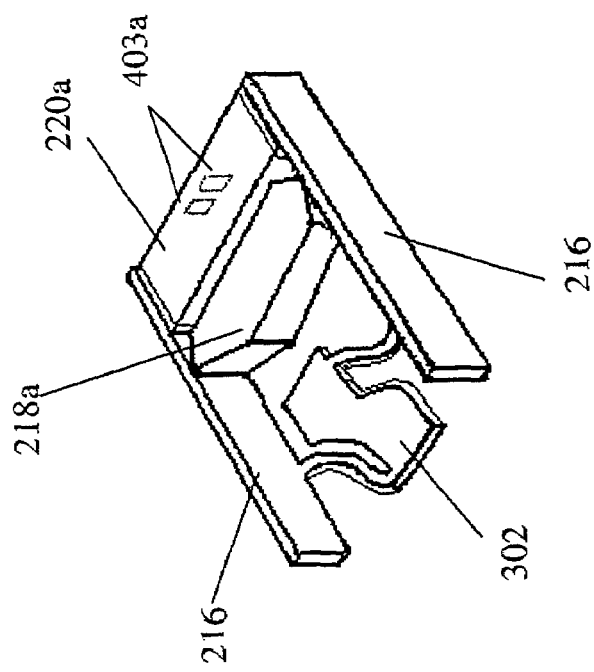
Figure 9A:
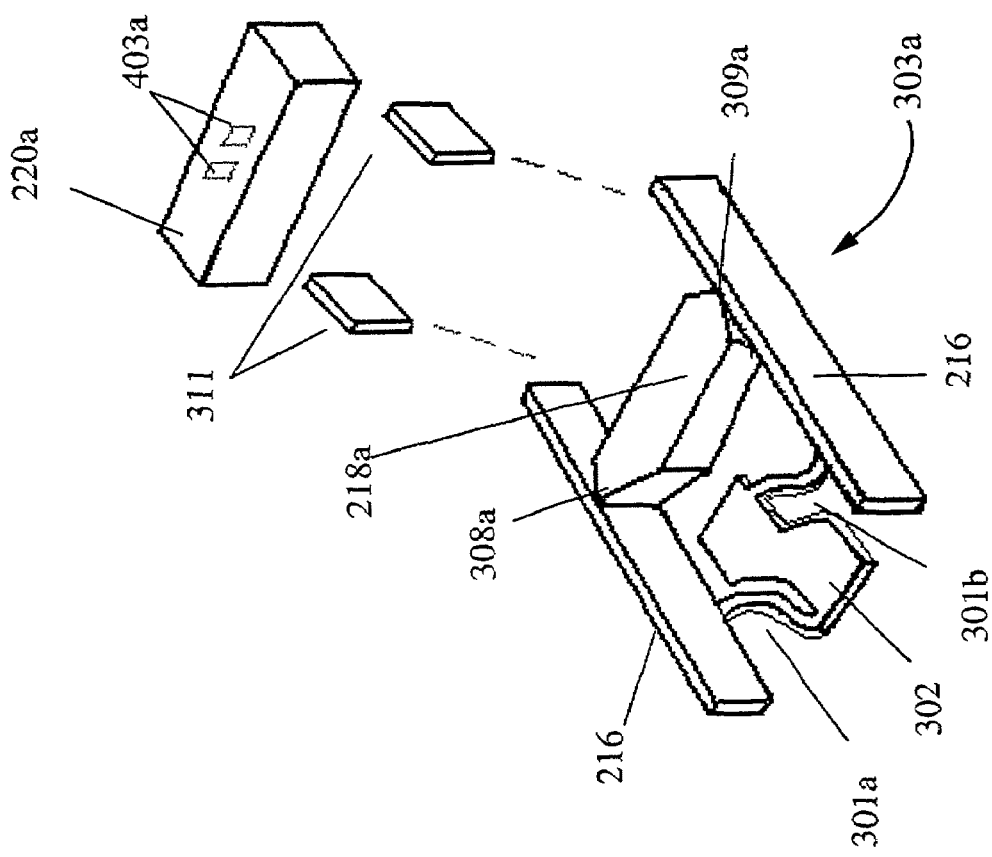
FIG. 9a shows an exploded view of a micro-actuator in accordance with a second embodiment of the instant invention.

FIG. 9a shows another embodiment of the instant invention in which the micro-actuator frame 303a integrates the rigid beam 218a having pointed ends 308a and 308b. In other words, in this embodiment the plate 307 has been eliminated and the rigid beam 218a is provided as part of the support frame 303a itself. The pointed ends 308a and 309a provide the same pivot functionality for the side arms 216 as explained above in connection with the first embodiment. As with the other embodiments herein, the frame 303a is preferably manufactured from metal, such as stainless steel, using a partial etching process, thereby enabling the structure to be very accurately shaped. This also enables laser welding, rather than adhesive or the like, to be used when assembling the micro-actuator and HGA, if desired. In this embodiment, the assembly process for the micro-actuator only involves mounting the PZT element 220a, having connection pads 403a thereon, on the micro-actuator frame 303a and between the two side arms 216 using, for example, epoxy or adhesive 311. FIG. 9b shows the micro-actuator of FIG. 9a after assembly. Once the micro-actuator is assembled, it is then ready to be incorporated into an HGA, as shown in FIGS. 9c and 9d.

The assembly process for the HGA is preferably the same as that described above in connection with FIGS. 4a and 4b. More specifically, a magnetic slider 201 is mounted on the rotatable plate 302 of the micro-actuator using, for example, two dots of epoxy 402. Two electric pads 403a are provided in the PZT element 220a which correspond to suspension pads 408 in the suspension tongue 405. Two electric balls (not show) are used to electrically couple the PZT element 220a of the micro-actuator and the suspension trace 211 through pads 408. The rigid beam 218a of the micro-actuator (with slider therein) is partially bonded on the suspension tongue 405 in a manner that enables the slider to smoothly rotate when the PZT element 220a is operated. The suspension tongue 405 is preferably configured to maintain the loading force on the center area of the slider through the dimple 503 (see FIG. 9e) of the load beam 207. At least four electric pads 407 are provided in the moving plate of the suspension tongue 405, which correspond with the electric pads 404 of the slider 201. Electric balls 217 (e.g., GBB or SBB) electrically couple the slider with the suspension traces 209, thereby enabling the read/write head of the slider to be controlled by the drive control system. FIG. 9d shows the HGA of FIG. 9c after assembly.

Figure 9E:
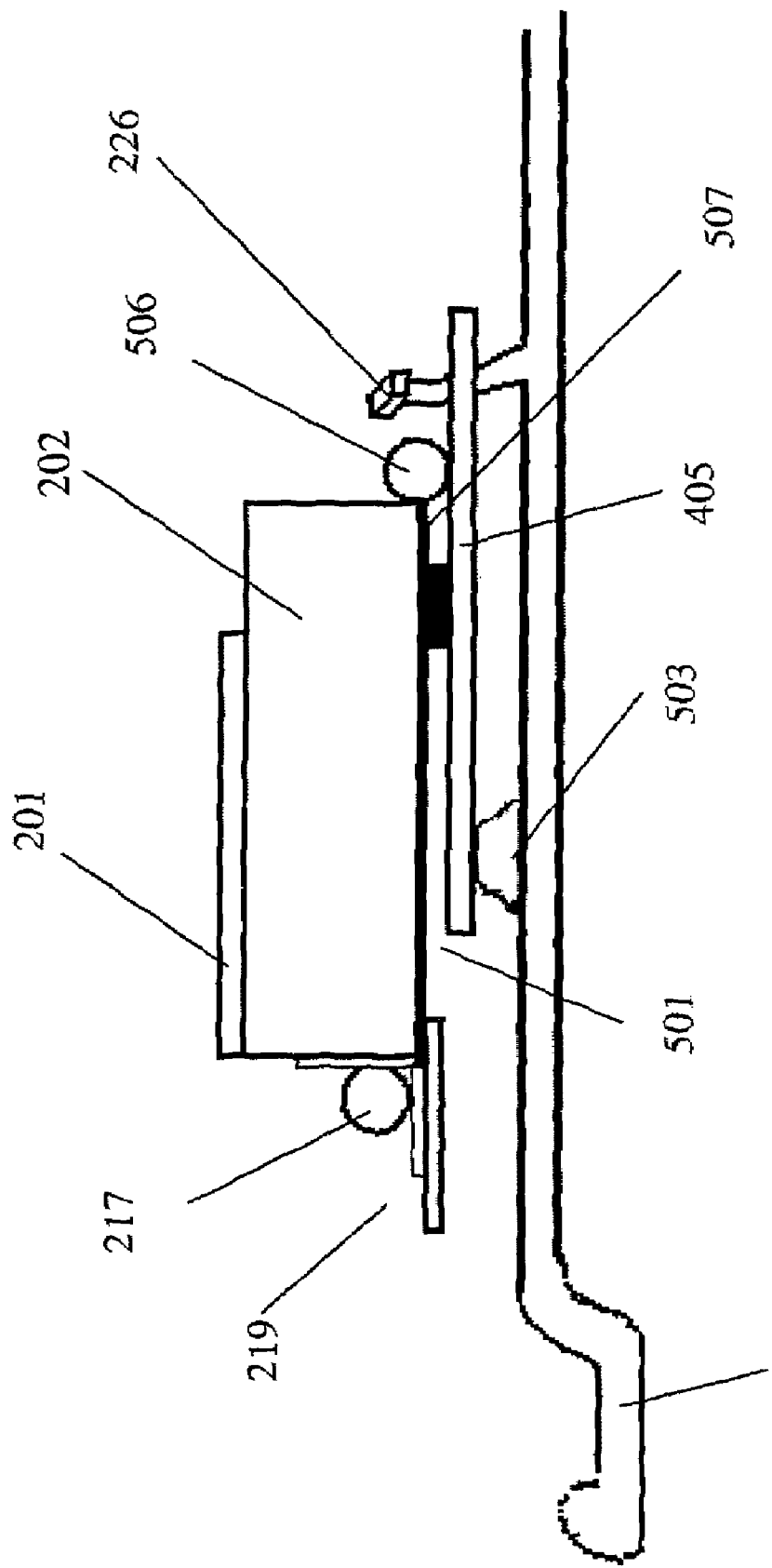
FIG. 9e is a side view of the HGA of FIG. 9d.

FIG. 9e shows a side view of the assembled HGA tongue region shown in FIG. 9d, which corresponds closely to the side view of the embodiment of FIG. 5. Specifically, a dimple 503 in the load beam 207 of the HGA supports the suspension tongue 405. The rotational PZT micro-actuator 202 with slider 201 is partially mounted on the suspension tongue 405, via the rigid beam 218a. Electric balls 506 (e.g., GBB or SBB) are used for electrical connection of the PZT element 220a, and electric balls 217 are used for electrical connection of the slider 201. Parallel gaps 501, 507 exist on the two sides of the partial mounting region. The first gap 501 enables the slider to rotate freely when driving the PZT element 220a of the micro-actuator. The other gap 507 enables the PZT element 220a to freely expand and contract when a voltage is input to the PZT element.

FIG. 10 shows a rotational PZT micro-actuator 202 with slider 201 therein constructed in accordance with the exemplary embodiments described above. FIGS. 11a and 11b show test results for the rotational PZT micro-actuator of the invention, as shown in the exemplary embodiment of FIG. 10. More specifically, curve 901 shows the resonance gain for the base plate excitation and curve 903 shows a corresponding phase for the base plate excitation. Curve 902 shows the resonance gain for the micro-actuator PZT excitation and curve 904 shows the corresponding phase for the PZT excitation. As can be seen by these test results, the invention significantly improves the operation of the device in a manner that facilitates fine head adjustments, larger servo bandwidths and increased disk storage capacity.

FIG. 12a shows another embodiment of the invention in which all of the elements of the micro-actuator frame 303b have the same thickness. In other words, the side arms 216, rigid beam 218b with pointed ends 308b and 309b, rotatable plate 302 and connection arms 301a' and 301b' have the same thickness. Thus, in this embodiment, the entire frame 303b can be cut from a sheet having a constant thickness. In other respects, this embodiment of the micro-actuator is similar to the embodiment of FIGS. 9a and 9b, in that the rigid beam 218b is integrated with the frame 303b. In another embodiment, a bottom plate, like bottom plate 307 of FIG. 3a, could be used. The PZT element 220b is mounted on the frame 303b between the side arms 216 via adhesive strips 311 or the like. FIG. 12b shows the assembled micro-actuator of the embodiment of FIG. 12a. The micro-actuator of this embodiment functions in generally the same manner described above with respect to the other embodiments. However, because of the thickness of the rotatable plate 302, the slider 201 sits above rather than between the two side arms 216 when assembled, as can be seen more clearly in FIGS. 13a-13c.

The assembly process for the HGA of this embodiment is preferably generally the same as that described above in connection with FIGS. 9c and 9d. More specifically, a magnetic slider 201 is mounted on the rotatable plate 302 of the micro-actuator using, for example, two dots of epoxy 402. Two electric pads 403b are provided in the PZT element 220b which correspond to suspension pads 408 in the suspension tongue 405. Two electric balls (not show) are used to electrically couple the PZT element 220b of the micro-actuator and the suspension trace 211 through pads 408. The rigid beam 218b of the micro-actuator (with slider therein) is partially bonded on the suspension tongue 405 in a manner that enables the slider to smoothly rotate when the PZT element 220b is operated. The suspension tongue 405 is preferably configured to maintain the loading force on the center area of the slider through the dimple 503 (see FIG. 13c) of the load beam 207. At least four electric pads 407 are provided in the moving plate of the suspension tongue 405, which correspond with the electric pads 404 of the slider 201. Electric balls 217 (e.g., GBB or SBB) electrically couple the slider with the suspension traces 209, thereby enabling the read/write head of the slider to be controlled by the drive control system. FIG. 13b shows the HGA of FIG. 13a after assembly.

FIG. 13c shows a side view of the assembled HGA tongue region shown in FIG. 13b. Specifically, a dimple 503 in the load beam 207 of the HGA supports the suspension tongue 405. The rotational PZT micro-actuator 202 with slider 201 is partially mounted on the suspension tongue 405, via the rigid beam 218b. Electric balls 506 (e.g., GBB or SBB) are used for electrical connection of the PZT element 220b, and electric balls 217 are used for electrical connection of the slider 201. Parallel gaps 501a, 507a exist on the two sides of the partial mounting region. In addition, a gap 509 is provided between the bottom surface of the slider 201 and the top surface of the micro-actuator 202 to avoid any interference therebetween.

Figure 14:
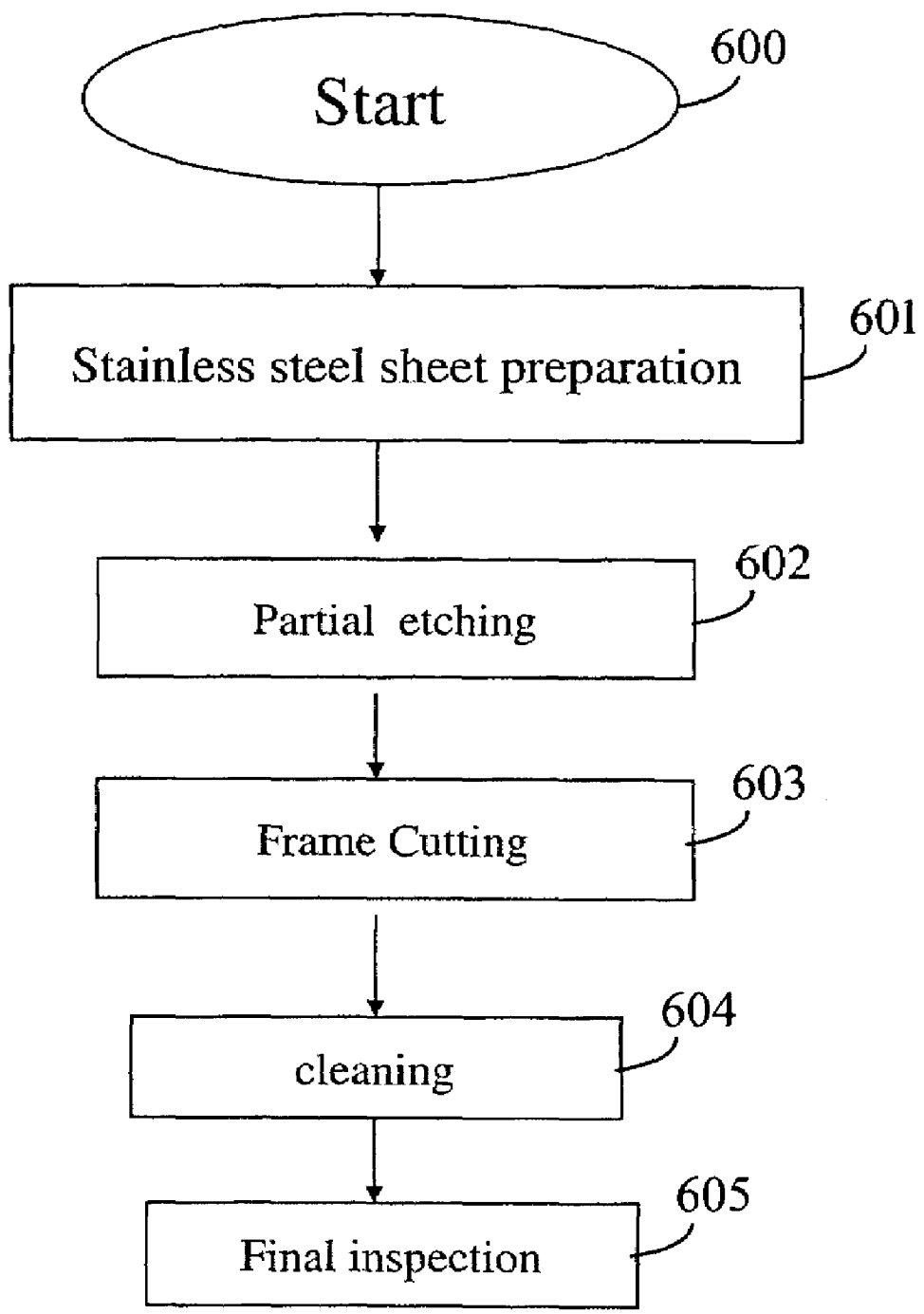
FIG. 14 shows a preferred frame manufacturing process for the micro-actuator of the instant invention.

FIG. 14 provides a general flow chart of the preferred and primary manufacturing steps used to make the rotational PZT micro-actuator frame of this invention. The process of FIG. 14 can be used to make any of the embodiments described herein. When the process starts (step 600), a metal sheet, such as a stainless steel metal sheet, is prepared for use (step 601). The metal sheet is then partially etched (step 602) and the micro-actuator frame is cut (step 603). The frame is then cleaned (step 604) and given a final inspection (step 605). Inasmuch as various manufacturing methods and steps for such devices are known to one skilled in the art, further details regarding this exemplary manufacturing method for the micro-actuator frame of this invention are not provided herein.

Figure 15:
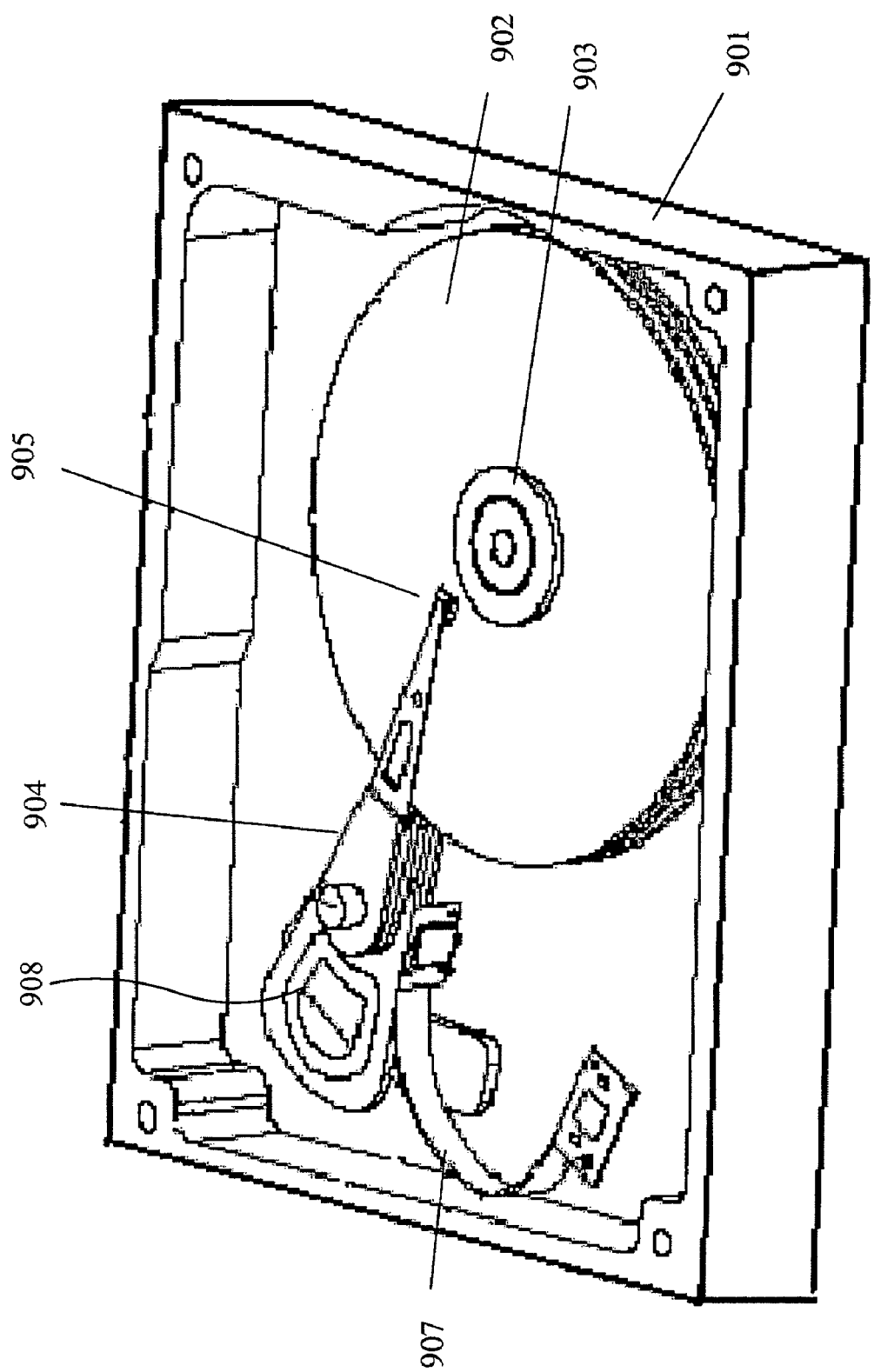
FIG. 15 is a perspective view of an exemplary disk drive unit incorporating an embodiment of the rotational PZT micro-actuator of the instant invention.

FIG. 15 shows an exemplary disk drive unit (HDD) incorporating the rotational PZT micro-actuator 905 of the instant invention. The HDD includes a housing 901, a disk 902, a spindle motor 903, a flex printed circuit 907, a VCM 908 and an HGA 904 constructed in accordance with the instant invention to enable advantageous resonance performance when the micro-actuator is operated to make fine head position adjustments. More specifically, the HGA 904 in FIG. 15 is provided with an embodiment of the rotational PZT micro-actuator as described herein. Because the structure, operation and assembly processes of disk drive units are well known to persons of ordinary skill in the art, further details regarding the disk drive unit are not provided herein so as not to obscure the invention.

While the preferred forms and embodiments of the invention have been illustrated and described herein, various changes and/or modifications can be made within the scope of the instant invention. Thus, the embodiments described herein are meant to be exemplary only and are not intended to limit the invention to any of the specific features thereof, except to the extent that any of the specific features are expressly recited in the appended claims.

What is claimed is:

1. A micro-actuator for a head gimbal assembly, comprising:
   a pair of actuator side arms;
   a PZT element extending between and connecting the actuator side arms;
   a rotatable plate positioned between the actuator side arms;
   a rigid beam that extends between the actuator side arms; and
   a pair of connection elements that connect the rotatable plate to the actuator side arms, respectively;
   wherein the rotatable plate rotates in a first direction when the PZT element contracts and a second direction when the PZT element expands, and
   wherein the rigid beam has pointed end portions for contact with the actuator side arms.

2. The micro-actuator of claim 1, wherein the rigid beam is located between the PZT element and the rotatable plate.

3. The micro-actuator of claim 1, further including a bottom plate that extends between and connects the actuator side arms.

4. The micro-actuator of claim 1, wherein the pair of connection elements are symmetrically configured relative to each other about a longitudinal axis or center of gravity of the rotatable plate.

5. The micro-actuator of claim 1, wherein distances are equal between the rigid beam and connection points where each of the connection elements connect with their respective actuator side arms.

6. The micro-actuator of claim 1, wherein the actuator side arms and rotatable plate have a different thickness.

7. The micro-actuator of claim 6, wherein the actuator side arms, the rotatable plate and the connection elements are integrally formed.

8. The micro-actuator of claim 1, wherein the actuator side arms, the rotatable plate and the connection elements are made from ceramic, metal, silicon or polymer.

9. The micro-actuator of claim 1, wherein the PZT element is ceramic or a thin film PZT element.

10. The micro-actuator of claim 9, wherein the PZT element is a single layer or multilayer PZT element.

11. A head gimbal assembly, comprising:
   a micro-actuator;
   a slider; and
   a suspension for supporting the micro-actuator, wherein a parallel gap exists between the suspension and a bottom of the micro-actuator;
   wherein the micro-actuator includes:
   a pair of actuator side arms;
   a PZT element extending between and connecting the actuator side arms;
   a rotatable plate positioned between the actuator side arms, wherein the slider is mounted on the rotatable plate;
   a rigid beam that extends between the actuator side arms; and
   a pair of connection elements that connect the rotatable plate to the actuator side arms, respectively;
   wherein the rotatable plate rotates in a first direction when the PZT element contracts and a second direction when the PZT element expands, and
   wherein the rigid beam has pointed end portions for contact with the actuator side arms.

12. The head gimbal assembly of claim 11, wherein a space between the actuator side arms is greater than the width of the slider.

13. The head gimbal assembly of claim 11, wherein the rigid beam is located between the PZT element and the rotatable plate.

14. The head gimbal assembly of claim 11, further including a bottom plate that extends between and connects the actuator side arms.

15. The head gimbal assembly of claim 11, wherein the pair of connection elements are symmetrically configured relative to each other about a longitudinal axis or center of gravity of the rotatable plate.

16. The head gimbal assembly of claim 11, wherein distances are equal between the rigid beam and connection points where each of the connection elements connect with their respective actuator side arms.

17. The head gimbal assembly of claim 11, wherein the actuator side arms and the rotatable plate have a different thickness.

18. The head gimbal assembly of claim 17, wherein the actuator side arms, the rotatable plate and the pair of connection elements are integrally formed.

19. The head gimbal assembly of claim 11, wherein the actuator side arms, the rotatable plate and the pair of connection elements are made from ceramic, metal, silicon or polymer.

20. The head gimbal assembly of claim 11, wherein the PZT element is ceramic or a thin film PZT element.

21. The head gimbal assembly of claim 20, wherein the PZT element is a single layer or multilayer PZT element.

22. A disk drive unit, comprising:
   a head gimbal assembly, including a slider, a micro-actuator and a suspension supporting the micro-actuator;
   a drive arm connected to the head gimbal assembly;
   a disk; and
   a spindle motor operable to spin the disk;
   wherein the micro-actuator includes:
   a pair of actuator side arms;
   a PZT element extending between and connecting the actuator side arms;
   a rotatable plate positioned between the actuator side arms, wherein the slider is mounted on the rotatable plate;
   a rigid beam that extends between the actuator side arms; and
   a pair of connection elements that connect the rotatable plate to the actuator side arms, respectively;
   wherein the rotatable plate rotates in a first direction when the PZT element contracts and a second direction when the PZT element expands, and
   wherein the rigid beam has pointed end portions for contact with the actuator side arms.

* * * * *